(12) United States Patent
Watanabe et al.

(10) Patent No.: US 8,643,808 B2
(45) Date of Patent: Feb. 4, 2014

(54) LIGHT-SCATTERING SUBSTRATE, METHOD FOR MANUFACTURING LIGHT-SCATTERING SUBSTRATE, POLARIZING PLATE AND IMAGE DISPLAY DEVICE

(75) Inventors: Jun Watanabe, Kanagawa (JP); Hiroyuki Yoneyama, Kanagawa (JP); Daisaku Abiru, Kanagawa (JP); Yusuke Ohashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 684 days.

(21) Appl. No.: 12/662,706

(22) Filed: Apr. 29, 2010

(65) Prior Publication Data

US 2010/0277674 A1 Nov. 4, 2010

(30) Foreign Application Priority Data

Apr. 30, 2009 (JP) ................................ P2009-111433

(51) Int. Cl.
*G02F 1/1335* (2006.01)
*G02B 5/30* (2006.01)

(52) U.S. Cl.
USPC ........................................ 349/96; 359/485.03

(58) Field of Classification Search
None
See application file for complete search history.

(56) References Cited

U.S. PATENT DOCUMENTS

| 8,325,293 B2* | 12/2012 | Watanabe et al. | 349/64 |
| 8,330,895 B2* | 12/2012 | Watanabe et al. | 349/64 |
| 2007/0229804 A1* | 10/2007 | Inoue et al. | 356/213 |

FOREIGN PATENT DOCUMENTS

| JP | 2000-075134 | 3/2000 |
| JP | 2001-172403 | 6/2001 |
| JP | 2003-025504 | 1/2003 |

\* cited by examiner

*Primary Examiner* — Sarah Hahm
(74) *Attorney, Agent, or Firm* — Jean C. Edwards, Esq.; Edwards Neils PLLC

(57) ABSTRACT

A light-scattering substrate having an irregular shape on one surface thereof is provided, the light-scattering substrate including: a thermoplastic resin; and at least one kind of transparent particles having a mean primary particle size of 3 μm or more and not more than 12 μm, wherein the light-scattering substrate contains a first region having a thickness of ½ or more times and not more than 4 times the mean primary particle size of the transparent particles from the surface having an irregular shape; and a second region having a thickness of 3/2 or more times the mean primary particle size of the transparent particles from a surface on back side of the surface having an irregular shape, and the first region and the second region have a region not substantially containing the transparent particle.

19 Claims, 8 Drawing Sheets

PRIOR ART

PRIOR ART

LIGHT-SCATTERING SUBSTRATE, METHOD FOR MANUFACTURING LIGHT-SCATTERING SUBSTRATE, POLARIZING PLATE AND IMAGE DISPLAY DEVICE

CROSS-REFERENCE TO RELATED APPLICATIONS

The present application claims priority from Japanese Patent Application No. 2009-111433, filed Apr. 30, 2009, the contents of which are herein incorporated by reference in their entirety.

BACKGROUND OF THE INVENTION

1. Field of the Invention

The present invention relates to a light-scattering substrate, a method for manufacturing a light-scattering substrate, a polarizing plate and an image display device.

2. Description of the Related Art

In recent years, a liquid crystal display device (LCD) has been widely used because it is slim, lightweight and low in a consumed power. The liquid crystal display device includes a liquid crystal cell and a polarizing plate. The polarizing plate is in general composed of a protective film and a polarizing film, and it is obtained by dyeing a polarizing film made of a polyvinyl alcohol film with iodine, stretching the film and then laminating the both surface thereof by protective films. In a transmission liquid crystal display device, this polarizing plate is installed on the both sides of a liquid crystal cell, and one or more optical compensatory sheets may be further disposed. Also, in a reflection liquid crystal display device, in general, a reflecting plate, a liquid crystal cell, one or more optical compensatory sheets and a polarizing plate are disposed in this order.

Since LCD is not a spontaneous emission-type display device, it requires a surface light source. As an embodiment of the surface light source, a backlight type in which a member having light diffusion capability, such as a diffusion sheet and a prism sheet, or the like is interposed between a liquid crystal cell and an emission light source, thereby forming a uniform surface light source is widely used. As the emission light source, a cold cathode fluorescent lamp (CCFL) or LED is used. Also, in a part of LCDs, there is known an embodiment (edge light type) in which a light source is disposed in an edge portion of a light guide plate, and a surface light source is realized through a combination with a diffusion sheet, a prism sheet or the like. As described previously, in these devices, since the surface light source is in general converted from a linear light source or a point light source, a uniform surface light source is realized using a diffusion sheet or a diffusion film (light diffusion sheet or light diffusion film).

Among the members of a backlight for obtaining a surface light source, the diffusion sheet is in general disposed between the backlight and the polarizing plate on the backlight side. By disposing the diffusion sheet, not only a reduction of brightness unevenness due to a light source and surface uniformity of a display characteristic can be achieved (see JP-A-2000-75134), but the generation of interference-induced stripes such as moire to be caused by interference of incident light with pixels in the liquid crystal cell can be suppressed.

However, in recent years, it has been attempted to reduce the number of members of a liquid crystal display device or to decrease the number of fluorescent lamps which are used for the light source for the purpose of achieving a low consumed power. Also, for the purpose of thinning LCD, a distance between the backlight light source and the diffusion sheet becomes short so that in related-art diffusion films, it becomes difficult to achieve uniform light diffusion. Then, in order to gain the distance as far as possible, a material having diffusibility on the surface of the polarizing plate on the backlight side is being used as a substitution of the diffusion sheet.

For example, JP-A-2000-75134 proposes a light diffusion polarizing plate having a light diffusion layer having prescribed characteristics, in which an porous amorphous particle and a spherical particle are dispersed and contained and discloses that the light diffusion sheet can be omitted thereby. Also, JP-A-2001-172403 and JP-A-2003-25504 propose a method for manufacturing a light diffusion film including casting a dope containing a fine particle on a support and discloses that according to this method, a light diffusion film which is excellent in optical isotropy or the like can be prepared.

SUMMARY OF THE INVENTION

However, the optical films disclosed in the foregoing patent documents are low in total light transmittance, and therefore, there may be the case where when used for an image display device, a lowering of the front white brightness is caused. On the other hand, for the purpose of keeping the front brightness, there may be the case where when a haze is lowered, namely the total light transmittance is increased, the deterioration of uniformity of a display screen (unevenness of the backlight or the like) or the generation of interference-induced stripes such as moire cannot be suppressed. These are caused due to the fact that an amorphous particle or a secondary particle in which light scattering properties are hardly controllable is used, or the shape of the surface is controlled only by items regarding the height, for example, Ra, Rt, etc., so that the control does not extend to the surface design for strict light scattering.

Also, there may be the case where the above-described optical films involve a problem in scar resistance such that they are injured by other optical member adjacent thereto, for example, a prism sheet, etc., or injure other optical member due to the surface irregular shape.

In particular, JP-A-2001-172403 discloses that what Ra is set to be not more than 0.2 μm is preferable because the surface becomes smooth. However, in order to make both optical and physical characteristics compatible with each other, it is necessary to precisely control the surface shape in a smooth region in the vicinity of this while taking into consideration a tilt angle, etc.

An object of the invention is to provide a light-scattering substrate which contributes to an enhancement of display performance and thinning of an image display device such as a liquid crystal display device, a polarizing plate and a method capable of manufacturing the light-scattering substrate simply and at low costs.

Another object of the invention is to provide an image display device which is high in a front white brightness, uniform and capable of suppressing interference-induced stripes such as moire within a screen, free from a problem of scar resistance and adaptive to thinning.

The foregoing objects have been achieved by the following constitutions.

(1) A light-scattering substrate having an irregular shape on one surface thereof, the light-scattering substrate including:
a thermoplastic resin; and
at least one kind of transparent particles having a mean primary particle size of 3 μm or more and not more than 12 μm,
wherein the light-scattering substrate contains a first region having a thickness of ½ or more times and not more than 4 times the mean primary particle size of the transparent particles from the surface having an irregular shape; and a second region having a thickness of 3/2 or more times the mean primary particle size of the transparent particles from a surface on back side of the surface having an irregular shape, and
the first region and the second region have a region not substantially containing the transparent particle.

(2) The light-scattering substrate according to (1) above,
wherein the surface of the light-scattering substrate having an irregular shape has an arithmetic mean roughness Ra, a mean spacing of irregularities Sm and a mean tilt angle of irregularities θa in conformity with JIS B0601, which are satisfied with following expressions (1) to (3):

$$0.03 \ \mu m \leq Ra \leq 0.3 \ \mu m \quad (1)$$

$$10 \ \mu m \leq Sm \leq 300 \ \mu m \quad (2)$$

$$0.2° \leq \theta a \leq 2.5° \quad (3)$$

(3) The light-scattering substrate according to (1) above,
wherein a tilt angle of irregularities of the surface of the light-scattering substrate having an irregular shape has following distribution:
(a) an integrated value of the frequency of 0° or more and less than 0.5° is less than 25%;
(b) an integrated value of the frequency of 0.5° or more and less than 10° is 65% or more and less than 100%; and
(c) an integrated value of the frequency of 10° or more is 0% or more and less than 20%.

(4) The light-scattering substrate according to any one of (1) to (3) above,
wherein the transparent particles are substantially spherical resin particles.

(5) The light-scattering substrate according to any one of (1) to (4) above,
wherein an absolute value of a difference between a refractive index of the transparent particles and a refractive index of the light-scattering substrate in the case of excluding the transparent particles from the light-scattering substrate is less than 0.09.

(6) The light-scattering substrate according to any one of (1) to (5) above, which has light scattering properties such that a value of an image clarity measured through an optical comb having a width of 2 mm by using an image clarity measuring apparatus in conformity with JIS K7105 is from 5% to 60%.

(7) The light-scattering substrate according to any one of (1) to (6) above,
wherein a transmitted scattered-light profile measured by a goniophotometer with an acceptance angle of 2° is satisfied with following expression (d):

$$0.03 \leq I(4°)/I0 \leq 0.07 \quad (d)$$

wherein I(4°) represents an transmitted light intensity at a position tilted by 4° from a normal line of the light-scattering substrate; and I0 represents a light intensity when a light source is measured from the front.

(8) The light-scattering substrate according to any one of (1) to (7) above,
wherein a haze value caused by inside is 0.1% or more and less than 30%; and a haze value caused by surface is 3% or more and less than 30%.

(9) A method for manufacturing a light-scattering substrate according to any one of (1) to (8) above, the method including: casting
a transparent particle-containing dope containing a thermoplastic resin and at least one kind of transparent particles having a mean primary particle size of 3 μm or more and not more than 12 μm; and
a dope for surface shape adjustment containing a thermoplastic resin and not substantially containing a particle having a mean primary particle size of 1 μm or more, in which a concentration of the thermoplastic resin is lower than that of the transparent particle-containing dope,
in this order simultaneously or sequentially on a support, thereby forming a film.

(10) The method for manufacturing a light-scattering substrate according to (9) above, which further includes casting a dope not substantially containing a particle having a mean primary particle size of 1 μm or more and composed of a thermoplastic resin,
wherein the dope not substantially containing a particle having a mean primary particle size of 1 μm or more and composed of a thermoplastic resin, the transparent particle-containing dope, and the dope for surface shape adjustment are casted in this order simultaneously or sequentially on a support, thereby forming a film.

(11) The method for manufacturing a light-scattering substrate according to (9) or (10) above,
wherein a flow rate is adjusted such that when a mean primary particle size of the transparent particles is defined as D, a film thickness of the dope for surface shape adjustment after drying is from (½)D to 4D.

(12) The method for manufacturing a light-scattering substrate according to any one of (9) to (11) above,
wherein a viscosity of the dope for surface shape adjustment at room temperature is 1 Pa·s or more and not more than 200 Pa·s.

(13) The method for manufacturing a light-scattering substrate according to any one of (9) to (12) above, which includes:
casting a dope not substantially containing a particle having a mean primary particle size of 1 μm or more and having a concentration of a thermoplastic resin lower than that of an adjacent dope simultaneously or sequentially between a plurality of dopes and the support, thereby forming a film.

(14) A polarizing plate, including:
a polarizing film; and
a protective film on or above at least one side of the polarizing film,
wherein the protective film is the light-scattering substrate according to any one of (1) to (8) above.

(15) An image display device, including:
the light-scattering substrate according to any one of (1) to (8) or the polarizing plate according to (14) above.

(16) An image display device, including:
a light source;
a lower polarizing plate;
a liquid crystal cell; and
an upper polarizing plate in this order,
wherein the lower polarizing plate is the polarizing plate according to (14) above.

Figure 1A:
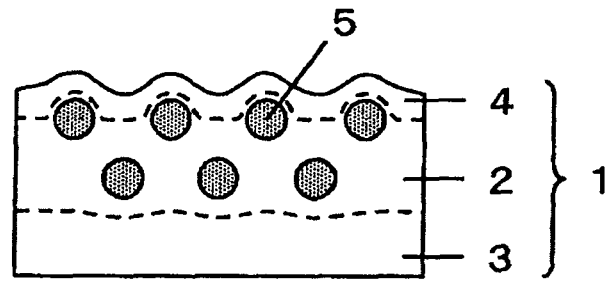
FIG. 1A is a sectional view showing an example of a light-scattering substrate of the invention.

The reference numerals in the drawings are set forth below.
1: Light-scattering substrate
2: Base layer
3: Surface layer
4, 4a, 4b: Surface layer
5: Transparent particle
6: First cured layer
7: Second cured layer
11: Stirrer
12: Transfer pump
13: Filter
14: Stock tank
15a: Transfer pump of casting solution for back layer
15b: Transfer pump of casting solution for base layer
15c: Transfer pump of casting solution for surface layer
15d: Transfer pump of casting solution for superficial layer
16a: Additive injection pump (solvent, matting agent, etc.)
16c: Additive injection pump (solvent, transparent particle, etc.)
16d: Additive injection pump (solvent, transparent particle, etc.)
17: Casting die
18: Casting band
19: Vacuum chamber
20: Casting drum
30: Casting die
32: Manifold
33: Feed block
41: Light source
42: Fluorescent lamp
43: Lower diffusion sheet
44: Condensing sheet
45: Upper diffusion sheet
46: Polarizing plate
47: Liquid crystal cell
48: Substrate
49: Light-scattering substrate

DETAILED DESCRIPTION OF THE INVENTION

Modes for carrying out the invention are hereunder described in detail, but it should not be construed that the invention is limited thereto. In this specification, in the case where a numerical value represents a physical property value, a characteristic value, etc., the terms "from (numerical value 1) to (numerical value 2)" mean "(numerical value 1) or more and not more than (numerical value 2)". Also, in this specification, the term "(meth)acrylate" means "at least one of acrylate and methacrylate". The same is also applicable to the terms "(meth)acrylic acid" and "(meth)acryloyl" or the like.

Figure 1B:
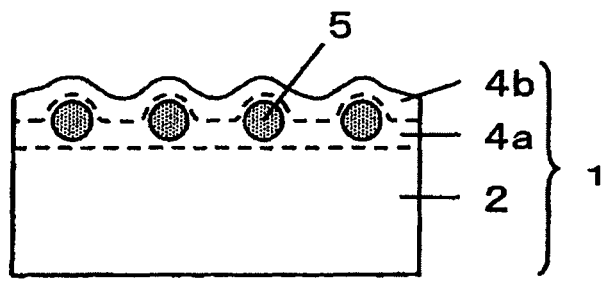
FIG. 1B is a sectional view showing an example of a light-scattering substrate of the invention.
Figure 1C:
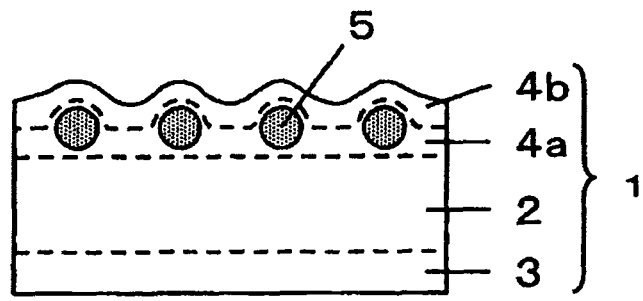
FIG. 1C is a sectional view showing an example of a light-scattering substrate of the invention.

The invention is concerned with a light-scattering substrate with controlled light scattering properties, in which a particle is disposed at a specified position in a thickness direction thereof and which has a specified irregular shape on the surface thereof. Specifically, as shown in FIGS. 1A to 1C, the light-scattering substrate of the invention is characterized in that a particle is disposed in a certain place in a thickness direction thereof, thereby enabling the frequency of a component with a low tilt angle in the vicinity of several degrees (0.5° or more and less than 10°) in a surface irregular shape to increase. In particular, when the light-scattering substrate of the invention is used as a protective film of a polarizing plate on the side of a backlight of a liquid crystal display device, it is possible to provide an image display device which is high in a front white brightness, uniform and capable of suppressing interference-induced stripes such as moire within a screen, free from damage of adjacent other member each other and adaptive to thinning.

<Configuration of Liquid Crystal Display Device>

Figure 8A:
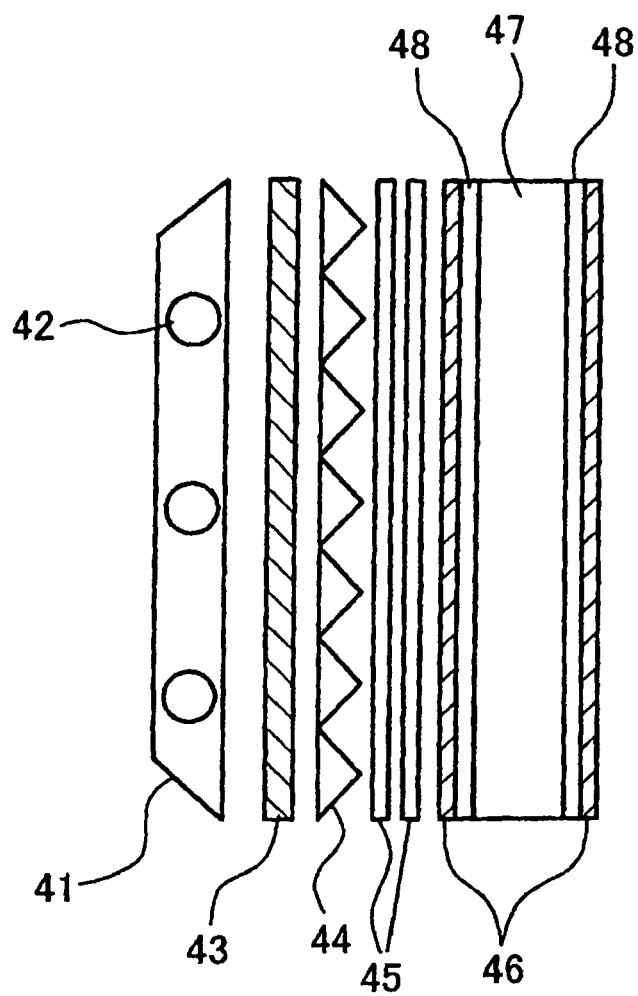
FIG. 8A is a schematic view showing an example of a related-art liquid crystal display device.

In an example of a configuration of a related-art liquid crystal display device, as shown in FIG. 8A, a configuration of [light source 41/light guide plate (fluorescent lamp) 42/lower diffusion sheet 43/condensing sheet 44 (prism sheet, etc.)/upper diffusion sheet 45/liquid crystal panel (lower polarizing plate 46/substrate 48/liquid crystal cell 47/substrate 48/polarizing plate 46)] from the light source side is exemplified. The lower diffusion sheet is an optical sheet with strong light diffusibility for chiefly reducing in-plane brightness unevenness of a backlight unit including the light source 41 and the light guide plate 42; the condensing sheet is an optical sheet for condensing diffused light into a frontal direction of the liquid crystal display device (a normal line direction of the plane of the display device); and the upper diffusion sheet is an optical sheet for reducing moire generated by the prism sheet which is the condensing sheet or a periodic structure such as pixels in the liquid crystal cell and for further reducing the in-plane brightness unevenness which has not been completely removed by the lower diffusion sheet etc.

Figure 8B:
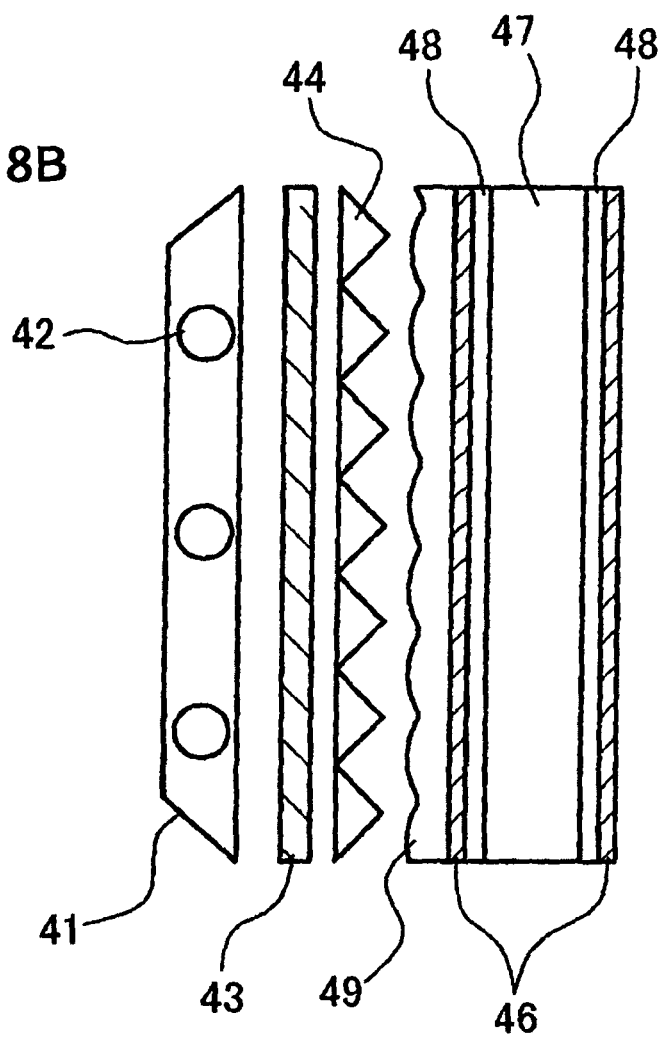
FIG. 8B is a schematic view showing an example of a liquid crystal display device of the invention.

As shown in FIG. 8B, an exemplary embodiment of the liquid crystal display device of the invention has a configuration of [light source 41/light guide plate (fluorescent lamp) 42/lower diffusion sheet 43/condensing sheet 44 (prism sheet, etc.)/liquid crystal panel (lower polarizing plate 46 including the light-scattering substrate 49/substrate 48/liquid crystal cell 47/substrate 48/upper polarizing plate 46)] from the light source side. Light diffusibility is imparted to a protective film of the lower polarizing plate by the light-scattering substrate 49 in place of the upper diffusion sheet, thereby displaying a performance equal to or more than that of the upper diffusion sheet. By taking the foregoing configuration, there give rise to effects that not only the moire or in-plane brightness unevenness is reduced, but a lowering of the front brightness or front contrast, which is a harmful influence in the related-art technologies using an upper diffusion sheet, is suppressed. Furthermore, by excluding the upper diffusion sheet, a thickness of the whole of the liquid crystal display device can be made thin, and in the case of using a plurality of upper diffusion sheets, this is more effective. Theoretically, it is possible to make the thickness thin in a proportion corresponding to the thickness of the excluded diffusion sheet.

Specifically, in the related-art technologies using an upper diffusion sheet, the incident light is diffused to an extent of a wide angle more than the necessity so that the quantity of the outgoing light to a frontal direction was relatively lowered. In the configuration of the invention, namely a liquid crystal display device in which the light diffusion profile of a light diffusive protective film imparted to the under polarizing plate is optimized, diffusibility that is necessary and sufficient for a reduction of the moire or brightness unevenness is imparted without lowering the quantity of the outgoing light to a frontal direction, and therefore, this problem can be solved. Also, by changing the characteristics of the backlight or the lower diffusion sheet or complexing these members, though the optimal light diffusion profile of the optical film having light diffusibility which is used in the invention is changed, it is possible to substantially display the desired performance within the foregoing configuration range.

The light scattering substrate of the present invention may be used as a protective film on the side of the surface of the upper diffusion sheet. In terms of bringing out the effects of the present invention effectively, as mentioned above, the light scattering substrate is preferably used with the lower diffusion sheet. The above configuration is also preferable from the standpoint that when the light scattering substrate of the present invention is used as a protective film on the side of the surface of the lower diffusion sheet, an optical film such as an antiglare film or a clear film can be arbitrarily selected and applied as a protective film on the side of the surface of the upper diffusion sheet.

Furthermore, in a part of liquid crystal display devices, there is one in which a brightness enhancing film (for example, 3M's DBEF) is used directly under the lower polarizing plate, and when a light-scattering substrate in the related-art is disposed in the protective film of the lower polarizing plate, there may be the case where depolarization takes place, thereby causing a lowering of the brightness enhancing performance. However, in the liquid crystal display device of the invention, since a light-scattering substrate in which the amount of a wide-angle scattering component with large polarization is small is used, it is possible to make a lowering of the brightness enhancing performance extremely small.

Since the irregularities of the surface of the light-scattering substrate of the invention in which the amount of a wide-angle scattering component is decreased are chiefly constituted of a component with a low tilt angle in the vicinity of several degrees, for example, even in the case where the light-scattering substrate of the invention is brought into contact with a vertex angle of the prism sheet and rubbed, the stress concentration is reduced so that problems such as damage on the prism sheet and breakage of the prism sheet are not caused.

<Surface Shape of Light-Scattering Substrate>

The light-scattering substrate of the invention is hereunder described.

The light-scattering substrate of the invention is a light-scattering film containing transparent particles having a mean primary particle size of from 3 μm to 12 μm and a thermoplastic resin, the light-scattering film having an irregular shape (tilted plane) on at least one surface thereof.

As shown in FIGS. 1A to 1C, in a light-scattering substrate 1 of the invention, a thickness of a surface layer 4, a surface layer 4b and a base layer 2 (see FIG. 1B) or a surface layer 3, each of which is a region not substantially containing a transparent particle 5 having a mean primary particle size of from 3 μm to 12 μm is made to fall within a specified range as described later. According to this, a surface having an irregular shape (surface of the surface layer 4 or the surface layer 4b) capable of obtaining preferred light scattering properties and a smooth back plane (the base layer 2 (see FIG. 1B), surface of the surface layer 3) adaptive to sticking to other member are obtained.

Figure 2A:
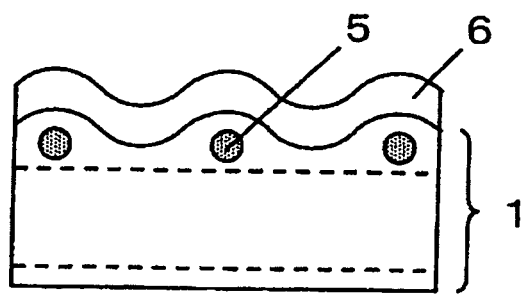
FIG. 2A is a sectional view showing an example of a related-art light-scattering substrate.
Figure 2B:
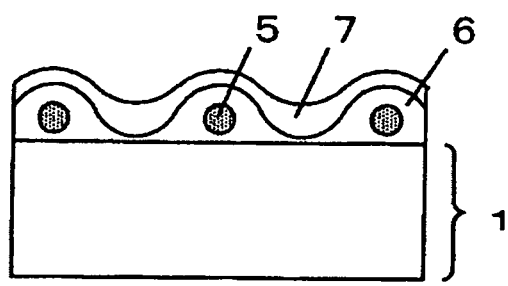
FIG. 2B is a sectional view showing an example of a related-art light-scattering substrate.

On the other hand, in the related-art light-scattering substrate, as shown in FIGS. 2A to 2B, the surface shape is changed by applying a cured layer 6, 7 for a superficial layer. However, it is ordinary to use a low-viscosity coating solution which is liable to achieve leveling, and though the height direction such as an Ra value can be adjusted. However, the frequency of respective low-tilt components in the vicinity of several degrees, which are effective for the moire elimination, is hardly increased so that it is difficult to make both the moire elimination and the front brightness compatible with each other. Also, unless a special apparatus is used, the man-hour for applying a cured layer increases so that a cost increase in the production is unavoidable.

In the following description, the surface in which the irregular shape is controlled for the purpose of controlling the light scattering properties is defined as side-A, and the other surface is defined as side-B. First of all, the shape of the side-A is described.

As described previously, for the purposes of reducing the wide-angle scattering and imparting the scar resistance, it is preferable that the irregular shape of the surface of side-A is random and configured of gentle tilted plane with continued irregularities. The irregular shape is achieved, for example, by locating the center of the transparent particle at anywhere from D to 4.5D in a film thickness direction from the surface of the side-A (wherein D represents a mean primary particle size of the transparent particle), namely by making the transparent particle substantially absent in the surface layer within the range of from D/2 to 4D, preferably from D/2 to 3D, more preferably 3D/4 to 2.5D from the irregular surface. When the explanation is made by reference to FIGS. 1A to 1C, in the light-scattering substrate 1 of the invention, when the mean primary particle size of the transparent particle 5 is defined as D, the thickness of the surface layer 4 or the surface layer 4b is from D/2 to 4D, and the transparent particle 5 does not substantially exist in the surface layer 4 or the surface layer 4b. When the transparent particle exists in the surface layer 4 or surface layer 4b with the thickness of from D/2 to 4D from the surface of side-A, the amount of the surface component with a high tilt angle increases so that wide-angle scattering is unnecessarily caused. When the thickness of the surface layer 4 or surface layer 4b in which the transparent particle does not substantially exist is larger than the range of from D/2 to 2D, the side-A becomes excessively smooth so that sufficient scattering is not obtainable.

Here, the terms "not substantially containing a transparent particle" mean that, for example, the number of transparent particles is preferably a few or less within the range of 10 m² of the light-scattering substrate. When the frequency (number) exceeds this range, there is a concern that such is recognized as a point defect on the side of the side-A; and there is a concern that when stuck to the polarizing plate, such becomes a cause of an air bubble on the side of the side-B.

Though the side-B is not particularly limited with respect to the surface irregularities, from the viewpoint of sticking to other member such as a polarizer, it is preferable that the side-B is smooth. When the mean primary particle size of the transparent particle is defined as D, a smooth surface shape on a level where adhesion or the like is not actually damaged can be achieved by making the transparent particle substantially absent within the range of 3/2D or more from the surface of the side-B. When the explanation is made by reference to FIGS. 1A to 1C, in the light-scattering substrate 1 of the invention, when the mean primary particle size of the transparent particle 5 is defined as D, the thickness of the surface layer 3 in FIG. 1A or FIG. 1C or the base layer 2 in FIG. 1B is 3D/2 or more, and the transparent particle 5 does not substantially exist in the surface layer 3 or the base layer 2. In FIG. 1C, the total thickness of the surface layer 3 and the base layer 2 may be 3D/2 or more. Though an upper limit of the range of 3/2D or more from the surface of the side-B in which the transparent particle is substantially absent is not particularly limited, the upper limit of the range is preferably an upper limit where the center of the particle is allowed to be located at from D to 5D in a film thickness direction from the surface of the side-A. Incidentally, as mentioned above, the center of the transparent particle is located at anywhere from D to 2.5D in a film thickness direction from the surface of the side-A. Further, the range of 3/2D or more from the surface of the side-B in which the transparent particle is substantially absent is preferable to properly adjust it such that the film thickness of the whole of the translucent substrate as described later falls within 200 μm.

An arithmetic mean roughness (Ra) of the side-B in conformity with JIS B0601 (1994, 2001) is preferably from 0.001 μm to 0.10 μm, more preferably from 0.001 μm to 0.05 μm, and most preferably from 0.001 μm to 0.03 μm.

Taking into consideration the whole of the substrate, with respect to the distribution position in the film thickness direction of the transparent particle, it is preferable that when the mean primary particle size is defined as D, the center of the particle is present in the vicinity of from D to 5D deep from the side-A. However, as described previously, by locating the center of the particle at anywhere from D to 4.5D in the film thickness direction from the surface of the side-A, the transparent particle is made substantially absent in the surface layer within the range of from D/2 to 4D from the surface of the side-A. So far as the center of the particle falls within the foregoing range, a desired surface shape of the side-A can be obtained.

Also, plural kinds of transparent particles may be used. In that case, among the used particles, a value of a kind of particles having the largest mean primary particle size is defined as the mean primary particle size D.

In the light-scattering substrate of the invention, it is necessary to control the tilt angle of the surface so as to have forward scattering properties. For that reason, with respect to the surface shape of the side-A, it is necessary that roughness parameters in conformity with JIS B0601 (an arithmetic mean roughness Ra, a mean spacing of irregularities Sm and a mean tilt angle of irregularities θa) are satisfied with the following expressions (1) to (3).

$$0.03 \text{ μm} \leq Ra \leq 0.3 \text{ μm} \tag{1}$$

$$10 \text{ μm} \leq Sm \leq 300 \text{ μm} \tag{2}$$

$$0.2° \leq θa \leq 2.5° \tag{3}$$

Also, the roughness parameters are preferably those satisfied with the following expressions (1') to (3').

$$0.05 \text{ μm} \leq Ra \leq 0.25 \text{ μm} \tag{1'}$$

$$30 \text{ μm} \leq Sm \leq 250 \text{ μm} \tag{2'}$$

$$0.4° \leq θa \leq 2.3° \tag{3'}$$

The roughness parameters are more preferably those satisfied with the following expressions (1") to (3").

$$0.08 \text{ μm} \leq Ra \leq 0.2 \text{ μm} \tag{1"}$$

$$50 \text{ μm} \leq Sm \leq 200 \text{ μm} \tag{2"}$$

$$0.5° \leq θa \leq 2.0° \tag{3"}$$

The roughness parameters are especially preferably those satisfied with the following expressions (1'''), (2''') and (3").

$$0.12 \text{ μm} \leq Ra \leq 0.2 \text{ μm} \tag{1'''}$$

$$60 \text{ μm} \leq Sm \leq 130 \text{ μm} \tag{2'''}$$

$$0.5° \leq θa \leq 2.0° \tag{3"}$$

These roughness parameters can be measured using a measuring instrument in conformity with JIS B0601 (1994, 2001), for example, SURFCORDER MODEL SE-3500, manufactured by Kosaka Laboratory Ltd.

When the value of Ra is 0.03 μm or more, a sufficient scattering effect can be obtained. On the other hand, when the value of Ra is not more than 0.3 μm, scattering of light even to an unnecessary wide-angle range can be prevented; a sufficient front brightness can be secured; and a problem of scar resistance with the adjacent member is not generated. Also, when the value of Sm is not more than 300 μm, the uniformity of a backlight is enhanced, and the moire is eliminated. Also, in preparing a light-scattering substrate using transparent particles having a mean primary particle size of from 3 μm to when the Sm is 10 μm or more, it becomes easy to make it compatible with θa of not more than 2.5°, and a target surface shape is easily obtainable. For eliminating the moire of the liquid crystal display device, it is preferable that the Sm is not more than a pitch of the prism sheet on the backlight side or not more than 2 times a pixel pitch of the liquid crystal cell. Furthermore, when the value of θa is 0.2° or more, the component of light to the straightforward direction does not excessively increase so that a sufficient scattering effect is obtainable. On the other hand, when the value of θa is not more than 2.5°, the unnecessary wide-angle scattering component is suppressed, the front brightness is enhanced, and the scar resistance with the adjacent member is kept good.

Next, in the invention, in the case where the surface shape of the side-A is expressed by another expression, namely expressed in terms of a tilt angle of the irregularities and a proportion thereof, it is determined by the following method.

First all, apexes of a triangle having an area of from 0.5 to 2 μm² are supposed on a transparent support, and normal lines are extended upwardly in the vertical direction from the three apexes (three normal lines on the support). A triangle is formed by three points where the three normal lines on the support intersect with the film surface (side-A). An angle formed by the normal line on the plane of the thus formed triangle with the normal line extended upwardly in the vertical direction from the support is defined as the tilt angle.

Next, how to determine a proportion (frequency) of the tilt angle is described. An area of 250,000 μm² (0.25 mm²) or more is divided into the foregoing triangles on the support, and with respect to all of the respective triangles, the tilt angle is measured. The tilt angle is determined at each measurement point, and a proportion of the number (frequency) of each tilt angle relative to the number of all of the measurement points is determined. This proportion is defined as the frequency of the tilt angle. In the invention, an integrated value of the frequency of the tilt angle in each of the ranges of 0° or more and less than 0.5°, 0.5° or more and less than 10.0° and 10.0° or more is determined. With respect to details of the measurement method, a method disclosed in paragraph [0012] on page 6 of JP-A-2007-108724 can be adopted.

In the invention, from the standpoint of making both the measurement accuracy and the measurement efficiency compatible with each other, the measurement area is preferably 250,000 μm² (0.25 mm²) or more, and more preferably 0.25 mm² or more and not more than 1.0 mm² on the film. From the standpoint of assuring the measurement accuracy, an area of the triangle as a measurement unit is preferably from 0.5 μm² to 2 μm².

There are several devices usable for the measurements. In the invention, Model SXM520-AS150, manufactured by Micromap Corporation (U.S.A.) is used. This device includes, as a light source, a halogen lamp in which an interference filter having a central wavelength of 560 nm is incorporated; and an objective lens having a power of from 2.5 times to 50 times. Data capturing is performed with a ⅔-inch CCD having pixels of 640×480 as standard equipment. In the invention, when the objective lens has a power of 10 times, the measurement unit for the tilt angle is set to be 0.8 μm², and the measurement area is set to be 500,000 μm² (0.5 mm²). If desired, by increasing the power of the objective lens, the measurement unit and the measurement area can be made small. The measurement data are analyzed using a software program such as MAT-LAB, manufactured by Math Works, Inc. (U.S.A.), and the distribution of the tilt angle can be calculated. In the invention, an interval of the tilt angle is set to be about 0.01°.

In the invention, it is preferable that the tilt angle of irregularities of the side-A of the light-scattering substrate has the following distribution.

(a) An integrated value of the frequency of 0° or more and less than 0.5° is less than 25%.

(b) An integrated value of the frequency of 0.5° or more and less than 10° is 65% or more and less than 100%.

(c) An integrated value of the frequency of 10° or more is 0% or more and less than 20%.

It is more preferable that the tilt angle has the following distribution.

(a) An integrated value of the frequency of 0° or more and less than 0.5° is less than 20%.

(b) An integrated value of the frequency of 0.5° or more and less than 10° is 68% or more and less than 100%.

(c) An integrated value of the frequency of 10° or more is 0% or more and less than 18%.

It is further preferable that the tilt angle has the following distribution.

(a) An integrated value of the frequency of 0° or more and less than 0.5° is not more than 15%.

(b) An integrated value of the frequency of 0.5° or more and less than 10° is 70% or more and less than 100%.

(c) An integrated value of the frequency of 10° or more is 0% or more and not more than 15%.

When the integrated value of the frequency of 0° or more and less than 0.5° in terms of the tilt angle is less than 25%, a proportion of the smooth plane is small so that sufficient scattering properties are obtainable. Also, when the integrated value of the frequency of 0.5° or more and less than 10° in terms of the tilt angle is 65% or more, a scattering component with an adequate scattering angle which is small in influences of a lowering of the front contrast can be sufficiently secured. Also, when the integrated value of the frequency of 10° or more in terms of the tilt angle is less than 20%, the front contrast can be secured while suppressing the scattering component on the wide-angle side, and the scar resistance can be kept good. In particular, from the viewpoint of the scar resistance, the proportion of a component having a tilt angle exceeding 20° is preferably less than 5%, and more preferably less than 2%.

Also, with respect to the surface shape of the light-scattering substrate in the invention, it is desirable that not only it has a gentle tilt structure in the vicinity of several degrees, but the proportion of a high-tilt angle component of 10° or more, which is problematic in the scar resistance, is small. For that reason, it is desirable that a solution (dope for the surface shape adjustment) on the side of the side-A not substantially containing a transparent particle is a few in leveling and is dried while properly keeping the shape of the transparent particle in the inside. Specifically, a viscosity of the dope at room temperature (preferably 25° C.) is preferably 1 Pa·s or more and not more than 200 Pa·s, more preferably from 5 Pa·s to 100 Pa·s, and further preferably from 10 Pa·s to 100 Pa·s. According to the conventional method such as coating, it is difficult to apply such a high-viscosity solution; and when a low-viscosity solution is applied, leveling is generated so that in particular, a high-tilt angle component could not be removed. With respect to this point, in the invention, by casting a high-viscosity thermoplastic resin solution (a dope of a polymer solution; for example, viscosity: 10 Pa·s), it is possible to obtain the foregoing surface shape having a high frequency of the tilt angle component of several degrees.

Also, so far as the desired surface shape is kept, the dope on the side of the side-A may include a photo- or thermosetting monomer, a conductive inorganic fine particle, a conductive polymer, a fluorine based or silicone based antifouling material, a sliding agent and the like. For the purpose of preventing blocking, an inorganic fine particle having a primary particle size of less than 1 μm or the like may be included on the side of the side-A and/or the side-B.

Furthermore, a hard coat layer, an antiglare layer, a conductive inorganic fine particle-containing layer, a conductive polymer layer, a fluorine based or silicone based antifouling layer, a low-refractive index layer, an antireflection layer or the like may be laminated on the side-A.

<Optical Characteristic of Light-Scattering Substrate>

In the case where in making light incident from the normal line direction of the light-scattering substrate, an intensity of the outgoing light which has transmitted through the light-scattering substrate (intensity of the outgoing light relative to the intensity of the incident light) is considered. The light intensity at the time of measuring substantially parallel light from the light sources from the front is defined as I0. When the same light is entered in the normal line direction of the light-scattering substrate of the invention, the light intensity of the outgoing light in the normal line direction which has transmitted through the light-scattering substrate is defined as I(0°). I(0°)/I0 which is a ratio of I(0°) to I0 defined above is preferably from 0.40 to 0.98, more preferably from 0.45 to 0.80, and most preferably from 0.50 to 0.70. What the I(0°)/I0 ratio is from 0.40 to 0.98 is preferable because a lowering of the white brightness at the time of white color development is small, and the display screen does not become dark.

In order to achieve the suppression of the moire or in-plane brightness unevenness while keeping the front white brightness and front contrast, it has been found that a material having a large light scattering intensity ratio onto the low-angle side (strong forward scattering properties) is preferable as the light-scattering substrate and that a film having a relatively large outgoing light intensity to the vicinity of from 2° to 6° relative to the linear light incident from the normal line direction of the substrate is preferable. In the case of the light-scattering substrate of the invention, I(4°)/I0 which is a ratio of an outgoing light intensity I(4°) at a position tilted by 4° from the normal line of the light-scattering substrate surface to I0 is preferably from 0.03 to 0.07, more preferably from 0.03 to 0.065, and most preferably from 0.035 to 0.06.

When the value of I(4°)/I0 is from 0.03 to 0.07, a lowering of the contrast is small, and the generation of moire can be suppressed. When this value is 0.03 or more, the moire elimination capability is enhanced, whereas when it is not more than 0.07, a lowering of the front contrast becomes small. Such a transmitted scattered-light profile is measured by a goniophotometer with an acceptance angle of 2°.

A haze value caused by the inside of the light-scattering substrate (an internal haze value, a value obtained by subtracting a surface haze value from a total haze value) is preferably 0.1% or more and less than 30%, more preferably from 0.5% to 27%, and most preferably from 1% to 25%. When the internal haze value falls with the foregoing range, a pattern, color unevenness, brightness unevenness and the like of a liquid crystal panel can be made difficult to see due to proper internal scattering in addition to surface scattering by the surface irregularities.

A haze value caused by the surface of the light-scattering substrate (a surface haze value) is preferably 3% or more and less than 30%, more preferably from 5% to 25%, and most preferably from 8% to 25%. Also, a total haze value of the light-scattering substrate is preferably from 4% to 40%, and more preferably from 5% to 30%.

A value of an image clarity of the light-scattering substrate which is measured through an optical comb having a width of 2 mm by using an image clarity measuring apparatus in conformity with JIS K7105 is preferably from 5% to 60%, more preferably from 10% to 60%, and most preferably from 20% to 55%. When the value of the image clarity falls within the foregoing range, not only a lowering of the front contrast is small, but a pattern, color unevenness, brightness unevenness, moire and the like of a liquid crystal panel can be made difficult to see.

<Transparent Particle>

The transparent fine particle in the light-scattering film of the invention is preferably substantially spherical. As described previously, the transparent fine particle is required to be distributed at a specified position in the inside of the light-scattering substrate in the thickness direction. A mean primary particle size of the transparent particle is from 3 μm to 12 μm. When the mean primary particle size of the transparent particle falls within the foregoing range, in addition to the formation of a convex, in the case of imparting internal scattering, wide-angle scattering is suppressed, and forward scattering is easily achieved. Furthermore, the mean primary particle size of the transparent particle is preferably more than 3.5 μm and not more than 11 μm, and most preferably more than 5 μm and not more than 10 μm. When the mean primary particle size of the transparent particle is less than 3 μm, a convex is hardly formed, and light is scattered even into an unnecessary wide angle. When the mean primary particle size of the transparent particle exceeds 12 μm, the surface adjustment of a layer containing the instant particle becomes difficult. A refractive index of the transparent particle is preferably from 1.40 to 1.65, more preferably from 1.45 to 1.60, and most preferably from 1.45 to 1.55.

An absolute value of a difference in the refractive index between the transparent particle and the light-scattering substrate is preferably less than 0.09, more preferably not more than 0.07, and further preferably not more than 0.05. The refractive index of the light-scattering substrate as referred to herein means a refractive index of the light-scattering substrate in the case of excluding the transparent particle from the light-scattering substrate (a portion other than the transparent particle of the light-scattering substrate). When the absolute value of a difference in the refractive index between the transparent particle and the light-scattering substrate is less than 0.09, a scattering angle at an interface of the transparent particle does not become excessively large, and the wide-angle scattering component does not increase. Also, when the absolute value of a difference in the refractive index between the transparent particle and the light-scattering substrate falls within the foregoing range, an optical characteristic with proper forward scattering properties can be displayed through a combination of internal scattering and surface scattering. In this case, the relation between the refractive index of the transparent particle and the refractive index of the light-scattering substrate is not limited. Specifically, the refractive index of the transparent particle may be larger than that of the light-scattering substrate or the refractive index of the transparent particle may be smaller than that of the light-scattering substrate. Further, a particle having larger refractive index relative to the refractive index of the light-scattering substrate and a particle having smaller refractive index relative to the refractive index of the light-scattering substrate may be used in combination.

In order to adjust the surface shape more accurately, it is also preferable using plural kinds of transparent particles. In this case, a particle, the difference in the refractive index between the particle and the light-scattering substrate being small, may be also used as a second kind of transparent particle. For example, it is effective that a particle, the difference in the refractive index between the particle and the light-scattering substrate being less than 0.03 and the average particle diameter of the particle being smaller than that of the internal scattering particle which is used as a first kind of transparent particle and being 3 μm or more and less than 6 μm, may be used in combination.

A use amount of the transparent particle is preferably from 0.1 $g/m^2$ to 5.0 $g/m^2$, more preferably from 0.2 $g/m^2$ to 3.0 $g/m^2$, and most preferably from 0.3 $g/m^2$ to 2.0 $g/m^2$ per unit area. When the use amount of the transparent particle falls within the foregoing range, a desired surface shape can be obtained.

Both of an inorganic particle and an organic particle are useful for the transparent particle. Examples of the inorganic particle include silica and alumina. For example, spherical silica and spherical alumina, manufactured by Micron Co., Ltd. are exemplified.

Examples of the organic particle include polymethacrylic acid methyl acrylate resins, acryl styrene based resins, polymethyl methacrylate resins, silicon based resins, polystyrene based resins, polycarbonate resins, benzoguanamine based resins, melamine based resins, polyolefin based resins, polyester based resins, polyamide based resins, polyimide based resins, polyfluoroethylene based resins having low refractive index and silicone resin.

With respect to a commercially available product, examples of the styrene or acryl based resin include CHEMISNOW MX Series and SX Series, manufactured by Soken Chemical & Engineering Co., Ltd.; and TECHPOLYMER, manufactured by Sekisui Plastics Co., Ltd. Examples of the benzoguanamine based resin include EPOSTAR, manufactured by Nippon Shokubai Co., Ltd.; examples of the melamine based resin include OPTBEADS, manufactured by Nissan Chemical Industries, Ltd.; and examples of the silicone resin includes TOSPEARL manufactured by Momentive Performance Materials Japan LLC.

From the viewpoint of adhesion to a thermoplastic resin in the light-scattering substrate and also the viewpoint of separation or falling of the interface due to the humidity or heat, it is preferable to use an organic particle having an expansion coefficient characteristic close to the thermoplastic resin. In the invention, it is especially preferable that the transparent particle is a substantially spherical resin particle.

<Material of Light-Scattering Substrate>

Next, a material of the light-scattering substrate according to the invention is described. A main component constituting the light-scattering substrate of the invention (a material accounting for 51% by mass or more and not more than 99% by mass of the solids content of the light-scattering film) is preferably a thermoplastic resin.

Specific examples thereof include cellulose acylates (for example, triacetyl cellulose (cellulose triacetate), diacetyl cellulose, propionyl cellulose, butyryl cellulose, acetyl butyryl cellulose (cellulose acetate butyrate), acetyl propionyl cellulose or nitrocellulose), polyamides, polycarbonate, polyesters (for example, polyethylene terephthalate, polyethylene naphthalate, poly-1,4-cyclohexanedimethylene terephthalate, polyethylene-1,2-diphenoxyethane-4,4'-dicarboxylate or polybutylene terephthalate), polystyrenes (for example, syndiotactic polystyrene), polyolefins (for example, polypropylene, polyethylene, polymethylpentene or polycycloalkanes), polysulfones, polyethersulfones, polyallylates, polyether imides, polymethyl acrylate, polyether ketones, norbornene based resins (for example, a trade name: ARTON, manufactured by JSR Corporation), amorphous polyolefins (for example, a trade name: ZEONEX, manufactured by Zeon Corporation) and (meth)acrylic resins (for example, a trade name: ACRYPET VRL20A, manufactured by Mitsubishi Rayon Co., Ltd., which is a ring structure-containing acrylic resin disclosed in JP-A-2004-70296 and JP-A-2006-171464). Of these, triacetyl cellulose, diacetyl cellulose, acetyl butyryl cellulose, propionyl cellulose, polycarbonate and modified polymethyl methacrylate are preferable; and triacetyl cellulose, acetyl butyryl cellulose and polycarbonate are especially preferable.

As a transparent protective film which is preferable for the use for a polarizing plate, uniformity among a lipophile-hydrophile balance of the film, sticking properties to a vinyl alcohol based film as a polarizing film and an optical characteristic of the whole within the film plane is important. In particular, fatty acid esters of cellulose (cellulose acylates) are preferable, and triacetyl cellulose, diacetyl cellulose, acetyl butyryl cellulose and propionyl cellulose are more preferable.

Figure 6A:
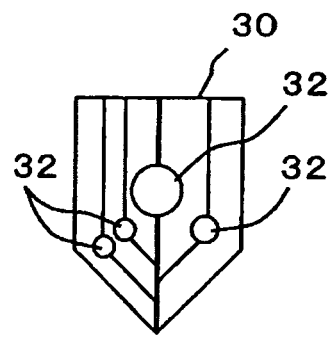
FIG. 6A is a view showing a co-casting die of a multi-manifold type.
Figure 6B:
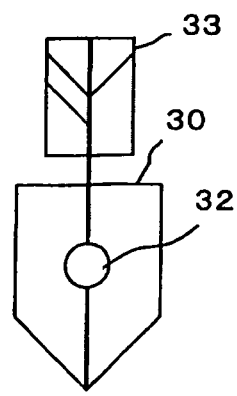
FIG. 6B is a view showing a co-casting die of a feed-block type.

For manufacturing the light-scattering film of the invention, a laminate casting method such as a co-casting (multi-layer simultaneous casting) and a sequential casting method can be adopted. In the case of manufacturing the light-scattering film by a co-casting method or a sequential casting method, first of all, plural dopes (solutions having a thermoplastic resin and optionally a transparent particle or the like dissolved in a solvent) are prepared. The co-casting method is a casting method in which dopes are extruded on a casting support (a band or a drum) from a casting Gieser (casting die) for simultaneously extruding plural dopes (may be three layers or more layers) from separate slits or the like, thereby simultaneously casting the respective layers, and after property drying, the resulting film is stripped off from the support and then dried to mold a light-scattering substrate. As the casting die, all of a multi-manifold type shown in FIG. 6A and a feed block type shown in FIG. 6B are useful. Also, an apparatus provided with a vacuum chamber in a dope discharge part is preferable.

Figure 3:
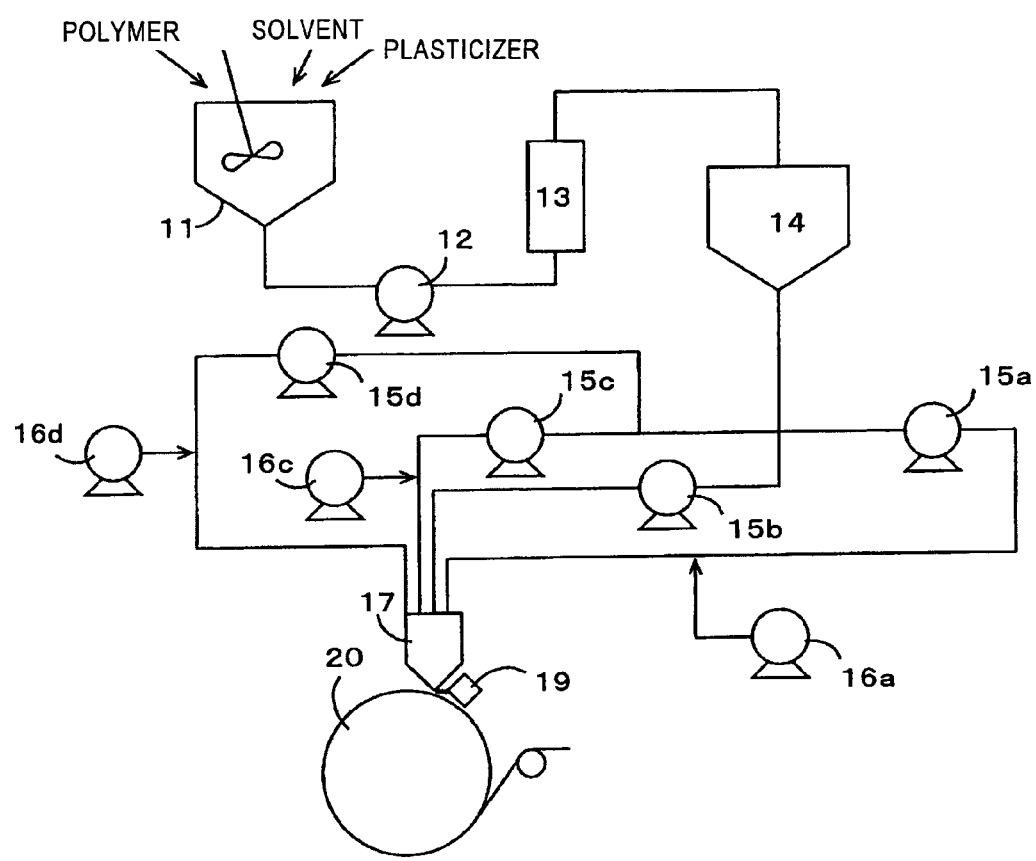
FIG. 3 is a view showing a solution deposition apparatus using a casting drum.
Figure 4:
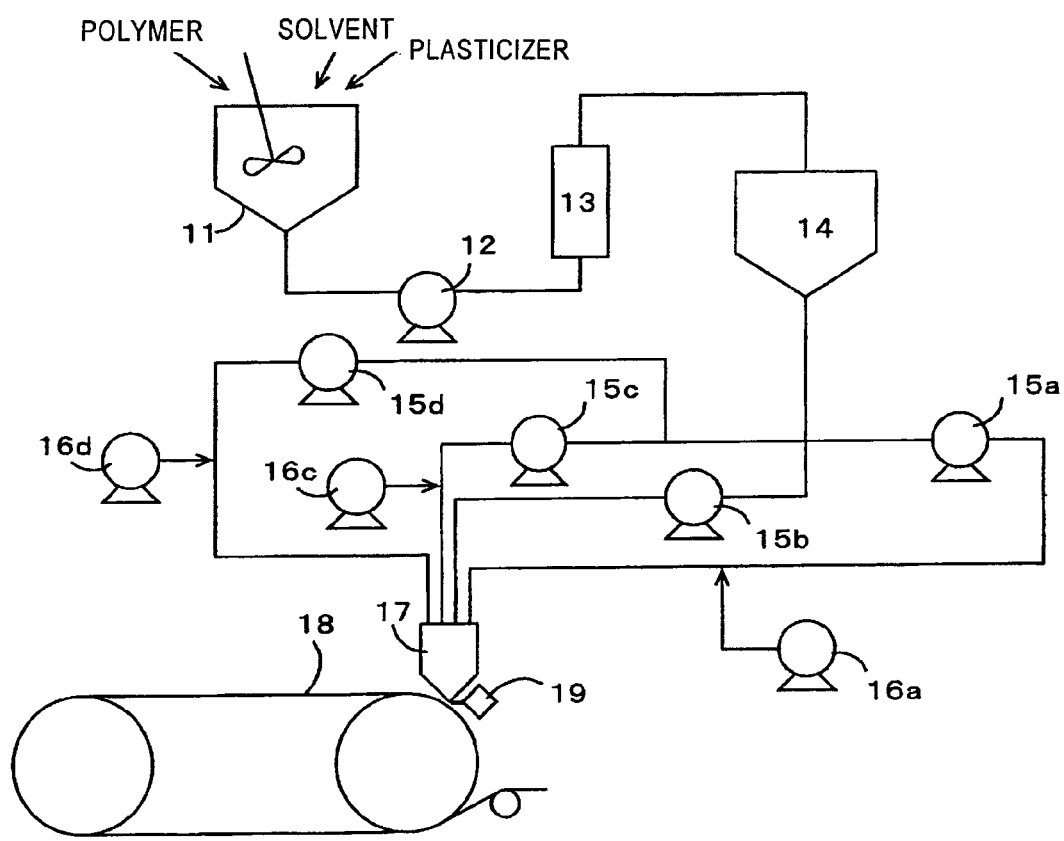
FIG. 4 is a view showing a solution deposition apparatus using a casting band.

Each of FIGS. 3 and 4 is a view showing an example of a solution deposition apparatus for performing casting. FIG. 3 shows an example using a casting drum as the support. In particular, according to this apparatus, by cooling the drum, the dope can be cooled for gelation or made in a state close to a gel during a time when it comes into contact with the support, the resulting film can be stripped off at an early timing, and the productivity is high. FIG. 4 shows an example using an endless belt as the support. This apparatus is concerned with a method in which the film is stripped off after the solvent is dried to an extent that the self-supporting properties are displayed during a time when the dope comes into contact with the belt.

The sequential casting method is a casting method in which a first casting dope is first extruded and cast on a casting support from a casting Gieser; a second casting dope is extruded and cast thereon after drying or without drying; and subsequently, a third or sequential dope is similarly sequentially cast and laminated; and the resulting film is stripped off from the support at an appropriate time and then dried to mold a light-scattering substrate. Also, during the time of from stripping off to drying, the substrate may be stretched in a fixed direction. Specifically, for example, it is preferable to stretch the substrate in a ratio of from about 0.9 times to 1.5 times in a longitudinal direction and/or a lateral direction.

As described previously, for the purpose of manufacturing the light-scattering substrate, any method of a co-casting method, a sequential casting method or a melt extrusion deposition method may be adopted. In general, in the sequential casting method, the steps are complicated and massive, and it is difficult to keep the flatness of the film; whereas in the co-casting method, the steps are simple, and the productivity is high. Therefore, it is preferable to manufacture the light-scatting substrate by a co-casting method.

Also, in order that leveling may not be caused at the beginning of casting, it is preferable to set the temperature of the support to be not higher than 20° C. Furthermore, in order to cause cooling for gelation after casting, it is also preferable to set the temperature of the support to be not higher than 0° C.

Furthermore, in the co-casting method, it is preferable that the dope containing a transparent particle is disposed in an internal layer part of the light-scattering film. Specifically, during the casting, it is preferable to arrange a dope which does not substantially contain a particle having a mean primary particle size of 1 µm or more, such as a transparent particle other than that of the dope, on the support surface or on the side of an air interface.

Accordingly, it is preferable that regions having a different existent amount of the transparent particle from each other are formed in a depth direction of the light-scattering substrate. Furthermore, it is preferable that a region where the existent amount of the transparent particle is large is present on the side of the side-A. The center of the particle is present in a region of a depth of preferably from 10% to 80% of the whole from the surface of the side of the side-A, more preferably from 10 to 75% of the whole from the surface of the side of the side-A, and most preferably from 10% to 50% of the whole in terms of a depth of the thickness direction of the light-scattering substrate from the surface of the side of the side-A.

In order to segregate the transparent particle in a specified depth direction, the light-scattering substrate can be formed by simultaneously or sequentially casting plural dopes having a different particle content from each other or co-extruding dissolved resins having a different particle content from each other. Furthermore, so far as the separation is not caused, the type of the thermoplastic resin may be different in each of the layers. For example, dopes having a different substituent or substitution amount of a cellulose acylate from each other may be laminated.

A film thickness of the light-scattering substrate is preferably from 20 µm to 200 µm, more preferably from 20 µm to 80 µm, and most preferably from 25 µm to 60 µm. In the case of forming the light-scattering substrate using plural dopes by means of co-extrusion, a thickness ratio of a surface layer dope (a total thickness in the case where the surface layer dope is present on the both sides) and a base layer dope {(total thickness of the surface layer dope)/(thickness of the base layer dope)×100} is preferably from 5% to 80%, and more preferably from 10% to 50%. When the thickness ratio is 5% or more, it is easy to form a uniform layer. Also, when the thickness ratio is not more than 80%, the interface between the dopes is stable, and the surface properties are scarcely impaired. The thickness of the dope (thickness of the film) as referred to herein means a thickness after the solvent has been evaporated (after drying). Also, the terms "surface layer dope" and "base layer dope" express the doped state where the thermoplastic resin is dissolved in the solvent and express the state where the surface layer and the base layer are formed adjacent to each other through a casting die, but they do not always express that an interface is present in the light-scattering substrate after the solvent has been evaporated. For that reason, in each of FIGS. 1A to 1C and FIGS. 2A to 2B, the interface is expressed by a broken line as an interface part between the respective dopes.

In the invention, in a preferred method for manufacturing the light-scattering substrate by means of co-casting or sequential casting, a transparent particle-containing dope containing a thermoplastic resin and at least one kind of a transparent particle having a mean primary particle size of 3 μm or more and not more than 12 μm and a dope for the surface shape adjustment not substantially containing a particle having mean primary particle size of 1 μm or more and composed of a thermoplastic resin, in which a concentration of the thermoplastic resin is lower than that of the transparent particle-containing dope, are cast in this order, thereby achieving deposition. Here, the transparent particle-containing dope may be a base layer dope (forming the layer 2 in FIG. 1A) or may be a surface layer dope (forming a layer 4a in FIGS. 1B and 1C). The dope for the surface shape adjustment is corresponding to a surface layer dope (forming the layer 4 in FIG. 1A or the layer 4b in FIGS. 1B and 1C). The concentration of the thermoplastic resin of the dope for the surface shape adjustment is lower than the concentration of the resin of the base layer dope preferably by from 0.1% by mass to 8.0% by mass, and more preferably by from 1.0% by mass to 5.0% by mass.

The transparent particle-containing dope may be cast on a dope not substantially containing a particle of 1 μm or more and composed of a thermoplastic resin (forming the layer 3 in FIG. 1A and the layer 2 in FIGS. 1B and 1C).

Also, a surface layer not substantially containing a particle of 1 μm or more and having a lower concentration of a thermoplastic resin than that of the adjacent dope (the layer 3 in FIGS. 1A and 1C) may be cast between the plural dopes and the support. The concentration of the resin of the dope is lower than the concentration of the resin of the adjacent dope preferably by from 0.1% by mass to 8.0% by mass, and more preferably by from 1.0% by mass to 5.0% by mass.

By making the resin concentration of the surface layer dope low, the "skin formation" (the state where drying of only the surface of the dope is advanced, whereby the resin concentration increases, and drying in the inside of the dope is not advanced) is not caused during the drying so that the productivity can be enhanced. Also, in an embodiment shown in FIG. 1C, by making the resin concentration of the dope of the layer 3 low, a smooth back surface (side-B) is obtainable. Further, the flow rate is preferably adjusted such that when the mean primary particle size of the transparent particles having a mean primary particle size of 3 μm to 12 μm is defined as D, the film thickness of the dope for the surface shape adjustment after drying is from (1/3)D to 2D.

According to the method for manufacturing the light-scattering substrate of the invention, a film having optimal scattering properties as the light-scattering substrate can be consistently prepared, and therefore, not only it is possible to devise to decrease the cost by reduction of the man-hour as compared with a measure for imparting scattering properties by coating or the like, but the resulting light-scattering substrate does not substantially include an interface. Thus, there are not caused problems in adhesion, interference unevenness to be generated at the interface and the like.

In the invention, a material which can be preferably used as the material of the light-scattering substrate is a cellulose acylate. In particular, the cellulose acylate is preferably a carboxylic acid ester having a total carbon atom number of from 2 to 22 of cellulose. Examples thereof include alkyl carbonyl esters, alkenyl carbonyl esters, cycloalkyl carbonyl esters, aromatic carbonyl esters or aromatic alkyl carbonyl esters of cellulose. Each of these esters may further have a substituted group.

The acyl group having from 2 to 22 carbon atoms of the cellulose acylate which is used in the invention may be an aliphatic acyl group or an aromatic acyl group and is not particularly limited. Preferred examples of such an acyl group include an acetyl group, a propionyl group, a butanoyl group, a heptanoyl group, a hexanoyl group, an octanoyl group, a cyclohexanecarbonyl group, an adamantane carbonyl group, a phenyl acetyl group, a benzoyl group, a naphthyl carbonyl group, a (meth)acryloyl group and a cinnamoyl group. Of these, an acetyl group, a propionyl group, a butanoyl group, a pentanoyl group, a hexanoyl group, a cyclohexanecarbonyl group, a phenyl acetyl group, a benzoyl group and a naphthyl carbonyl group are more preferable as the acyl group.

As the cellulose acylate which is suitably used in the invention, those in which a degree of substitution on the hydroxyl group of cellulose is satisfied with the following expressions (7) and (8) are preferable.

$$2.3 \leq (SA' + SB') \leq 3.0 \tag{7}$$

$$0 \leq SA' \leq 3.0 \tag{8}$$

Here, SA' represents a degree of substitution of the acetyl group substituting the hydrogen atom of the hydroxyl group of cellulose; and SB' represents a degree of substitution of the acyl group having from 3 to 22 carbon atoms substituting the hydrogen atom of the hydroxyl group of cellulose. SA represents an acetyl group substituting the hydrogen atom of the hydroxyl group of cellulose; and SB represents an acyl group having from 3 to 22 carbon atoms substituting the hydrogen atom of the hydroxyl group of cellulose.

A glucose unit constituting cellulose and forming a β-1,4-bond has free hydroxyl groups at the 2-position, 3-position and 6-position thereof. The cellulose acylate is one obtained by esterifying a part or all of these hydroxyl groups by the acyl group. The degree of acyl substitution means a proportion of esterification on the hydroxyl group with respect to each of the 2-position, 3-position and 6-position (the degree of substitution of the esterification with 100% at each position is 1). In the invention, a total sum of degrees of substitution of SA and SB (SA'+SB') is more preferably from 2.6 to 3.0, and especially preferably from 2.70 to 3.00. Also, the degree of substitution of SA (SA') is more preferably from 1.4 to 3.0, and especially preferably from 2.3 to 2.9.

Also, in the invention, the carbon atom number of the acyl group substituting the hydrogen atom of the hydroxyl group of cellulose as the foregoing SB is preferably 3 or 4. It is preferable that the degree of substitution substituted with the acyl group having the foregoing carbon atom number is simultaneously satisfied with the following expression (9) in addition to the foregoing expressions (7) and (8).

$$0 \leq SB'' \leq 1.2 \quad (9)$$

Here, SB" represents a degree of substitution of the acyl group having from 3 or 4 carbon atoms substituting the hydrogen atom of the hydroxyl group of cellulose.

The degree of substitution is obtained by measuring a degree of bond of a fatty acid bonded to the hydroxyl group in cellulose, followed by calculation. As the measurement method, the measurement can be performed in conformity with ASTM-D817-91 and ASTM-D817-96. Also, the state of substitution of the acyl group on the hydroxyl group can be measured by the $^{13}C$-NMR method.

In the foregoing cellulose acylate film, it is preferable that the polymer component constituting the film is substantially composed of a cellulose acylate which is satisfied with the foregoing expressions (7) and (8). The term "substantially" means that the cellulose acylate accounts for 55% by mass or more (preferably 70% by mass or more, and further preferably 80% by mass) of the whole of polymer components. The cellulose acylate may be used singly or in combinations with two or more kinds thereof.

A degree of polymerization of the cellulose acylate which is preferably used in the invention is from 200 to 700, preferably from 230 to 550, further preferably from 230 to 350, and especially preferably from 240 to 320 in terms of a viscosity average degree of polymerization. The viscosity average degree of polymerization can be measured by an intrinsic viscosity method by Uda, et al. (Kazuo Uda and Hideo Saito, *Sen'i Gakkaishi* (Journal of the Society of Fiber Science and Technology, Japan), Vol. 18, No. 1, pages 105 to 120 (1962)). Furthermore, this method is disclosed in detail in JP-A-9-95538.

Also, it is desirable that a number average molecular weight Mn of the cellulose acylate is preferably in the range of from $7 \times 10^4$ to $25 \times 10^4$, and more preferably in the range of from $8 \times 10^4$ to $15 \times 10^4$. Also, in the cellulose acylate, a ratio (Mw/Mn) of a mass average molecular weight Mw to the number average molecular weight Mn is preferably from 1.0 to 5.0, and more preferably from 1.0 to 3.0. The average molecular weight and molecular weight distribution of the cellulose acylate can be measured by means of high performance liquid chromatography. The foregoing Mn and Mw can be calculated using this, and the Mw/Mn can be calculated.

[Plasticizer]

In the invention, for the purposes of imparting flexibility to the light-scattering substrate, enhancing the dimensional stability and enhancing the moisture resistance, a plasticizer may be used.

In the case where the cellulose acylate is used as a material of the light-scattering substrate, a plasticizer having an octanol-water partition coefficient (log P value) of from 0 to 10 is especially preferably used. When the log P value of the compound is not more than 10, its compatibility with the cellulose acylate is good so that inconveniences such as cloudiness or powering of the film are not caused. Also, when the log P value is 0 or more, the hydrophilicity does not excessively increase, and therefore, adverse influences such as deterioration of water resistance of the cellulose acylate film are hardly caused. Thus, it is preferable to use a plasticizer having a log P value falling within the foregoing range. The log P value is more preferably in the range of from 1 to 8, and especially preferably in the range of from 2 to 7.

The measurement of the octanol-water partition coefficient (log P value) can be carried out by a flask osmosis method described in Japanese Industrial Standards (JIS) Z7260-107 (2000). The log P value can also be estimated by a computational chemistry method or an empirical method rather than the actual measurement. Examples of the calculation method which can be preferably employed include the Crippen's fragmentation method [*J. Chem. Inf. Comput. Sci.*, 27, 21 (1987)], the Viswanadhan's fragmentation method [*J. Chem. Inf. Comput. Sci.*, 29, 163 (1989)] and the Broto's fragmentation method [*Eur. J. Med. Chem.—Chim. Theor*, 19, 71 (1984)]. Of these, the Crippen's fragmentation method is more preferable. In the case where the log P value of a certain compound varies with the measurement method or the calculation method, it is desired to employ the Crippen's fragmentation method to determine whether or not the compound falls within the range of the invention.

As the plasticizer which is preferably added, low-molecular compounds or oligomer compounds having physical properties falling within the foregoing range and having a molecular weight of from about 190 to 5,000 are exemplified. For example, phosphoric esters, carboxylic acid esters, polyol esters and the like are useful.

Examples of the phosphoric ester include triphenyl phosphate (TPP), tricresyl phosphate, cresyl diphenyl phosphate, octyl diphenyl phosphate, biphenyl diphenyl phosphate, trioctyl phosphate and tributyl phosphate. Of these, triphenyl phosphate and biphenyl diphenyl phosphate are preferable.

Representative examples of the carboxylic acid ester include phthalic esters and citric esters. Examples of the phthalic ester include dimethyl phthalate, diethyl phthalate, dibutyl phthalate, dioctyl phthalate, diphenyl phthalate and diethylhexyl phthalate. Examples of the citric ester include triethyl O-acetylcitrate, tributyl O-acetylcitrate, acetyltriethyl citrate and acetyl tributyl citrate.

These preferred plasticizers are a liquid at 25° C. except for TPP (melting point: about 50° C.) and have a boiling point of 250° C. or higher.

Examples of other carboxylic acid esters include butyl oleate, methylacetyl ricinolate, dibutyl sebacate and various trimellitic esters. Examples of glycolic esters include triacetin, tributyrin, butylphthalylbutyl glycolate, ethylphthalylethyl glycolate, methylphthalylethyl glycolate, butylphthalylbutyl glycolate, methylphthalylmethyl glycolate, propylphthalylpropyl glycolate, butylphthalylbutyl glycolate and octylphthalyloctyl glycolate.

Also, plasticizers disclosed in JP-A-5-194788, JP-A-60-250053, JP-A-4-227941, JP-A-6-16869, JP-A-5-271471, JP-A-7-286068, JP-A-5-5047, JP-A-11-80381, JP-A-7-20317, JP-A-8-57879, JP-A-10-152568 and JP-A-10-120824 are preferably used. According to these patent documents, there are a number of disclosures regarding not only enumerations of plasticizers but use methods or characteristics thereof. These are also preferably adoptive in the invention.

As other plasticizers, (di)pentaerythritol esters disclosed in JP-A-11-124445; glycerol esters disclosed in JP-A-11-246704; diglycerol esters disclosed in JP-A-2000-63560; citric esters disclosed in JP-A-11-92574; substituted phenyl phosphoric esters disclosed in JP-A-11-90946; esters compounds containing an aromatic ring or a cyclohexane ring disclosed in JP-A-2003-165868; and the like are preferably used.

Also, oligomer or polymer plasticizers including a resin component having a molecular weight of less than about 100,000 is preferably used. Examples thereof include polyesters and/or polyethers disclosed in JP-A-2002-22956 or JP-A-2010-53254, polyesters and/or polyethers disclosed in WO2009-110159 A1 the entire disclosure of which is incorporated herein by reference; polyester ethers, polyester urethanes or polyesters disclosed in JP-A-5-197073; copolyester ethers disclosed in JP-A-2-292342: and epoxy resins or novolak resins disclosed in JP-A-2002-146044, etc.

Such a plasticizer may be used singly or in admixture of two or more kinds thereof. An addition amount of the plasticizer is from 2 parts by mass to 30 parts by mass, and especially preferably 5 parts by mass to 20 parts by mass based on 100 parts by mass of the cellulose acylate. Also, in the layer containing the transparent particle, for the purposes of improving the compatibility between the cellulose acylate and the transparent particle and improving the brittleness, it is preferable to increase the content of the plasticizer.

[Ultraviolet Ray Absorber]

For the purpose of enhancing the light fastness of the film per se or preventing the deterioration of an image display member of a liquid crystal compound, etc. of a polarizing plate or a liquid crystal display device, it is preferable to add an ultraviolet ray absorber (ultraviolet ray inhibitor) in the foregoing light-scattering substrate.

As the ultraviolet ray absorber, ones having excellent absorbing capability of ultraviolet rays having a wavelength of not more than 370 nm from the standpoint of preventing the deterioration of a liquid crystal and having low absorption of visible light having a wavelength of 400 nm or more as far as possible from the standpoint of revealing good image display properties are preferably used. In particular, the transmittance at a wavelength of 370 nm is desirably not more than 20% by mass, preferably not more than 10% by mass, and more preferably not more than 5% by mass. Examples of such an ultraviolet ray absorber include hydroxybenzophenone based compounds, benzotriazole based compounds, salicylic ester based compounds, benzophenone based compounds, cyanoacrylate based compounds, nickel complex salt based compounds and polymer ultraviolet ray absorbing compounds containing the foregoing ultraviolet ray absorbing group. However, it should not be construed that the invention is limited thereto. The ultraviolet ray absorber may be used in combination of two or more kinds thereof.

In the invention, a use amount of the ultraviolet ray absorber is preferably from 0.1 to 5.0 parts by mass, preferably from 0.5 to 4.0 parts by mass, and more preferably from 0.8 to 2.5 parts by mass based on 100 parts by mass of the thermoplastic resin which is used in the light-scattering substrate.

[Other Additives]

Furthermore, in the composition (dope) for forming the light-scattering substrate, other various additives (for example, a deterioration inhibitor (for example, an antioxidant, a peroxide decomposing agent, a radical inhibitor, a metal inactivating agent, an acid scavenger, an amine, etc.), an optical anisotropy controlling agent, a release agent, an antistatic agent, an infrared ray absorber, etc.) can be added in each of the preparation steps depending upon the application. These additives may be either solid or oily. That is, they are not particularly limited with respect to their melting points or boiling points. Moreover, as the infrared ray absorber, one disclosed in, for example, JP-A-2001-194522 can be used.

With respect to the timing of adding such an additive, the additive may be added in any stage of the dope preparation step, and a step of adding the additive and preparing the dope may be added in the final preparation step of the dope preparation step. Moreover, the addition amount of each material is not particularly limited so far as the function is revealed. Also, in the case where the light-scattering substrate is formed of multiple layers, the kinds and addition amounts of the thermoplastic resin and additives in each layer may be different. Though these are disclosed in, for example, JP-A-2001-151902, etc., they are conventionally known technologies. With respect to these materials inclusive of the foregoing ultraviolet ray absorber, materials which are disclosed in detail in *Journal of Technical Disclosure No.* 2001-1745 (issued on Mar. 15, 2001, by the Japan Institute of Invention and Innovation) are preferably used.

With respect to the use amount of such an additive, it is preferable that the additive is properly used in an amount in the range of from 0.001% by mass to 20% by mass in the whole of the composition constituting the light-scattering substrate.

[Solvent]

Next, an organic solvent for dissolving the materials for forming the light-scattering substrate therein is described. As the organic solvent to be used, conventionally known organic solvents are exemplified, and examples thereof include those having a solubility parameter in the range of from 17 to 22. The solubility parameter refers to the content described in, for example, J. Brandrup, E. H. Immergut, et al., *Polymer Handbook (Fourth Edition)*, VII/671 to VII/714. Examples of such an organic solvent include chlorides of a lower aliphatic hydrocarbon, lower aliphatic alcohols, ketones having from 3 to 12 carbon atoms, esters having from 3 to 12 carbon atoms, ethers having from 3 to 12 carbon atoms, aliphatic hydrocarbons having from 5 to 8 carbon atoms, aromatic hydrocarbons having from 6 to 12 carbon atoms and fluoroalcohols (for example, compounds disclosed in JP-A-8-143709, paragraph [0020], JP-A-11-60807, paragraph [0037], etc.).

The materials for forming the light-scattering material are dissolved in a concentration of preferably from 10% by mass to 30% by mass, more preferably from 13% by mass to 27% by mass, and especially preferably from 15% by mass to 25% by mass in the organic solvent. With respect to a method for preparing the dope in this concentration, the dope may be prepared so as to have a prescribed concentration at the dissolution stage, or after previously preparing a solution with a low concentration (for example, from 9% by mass to 14% by mass), the solution may be adjusted so as to have a prescribed high concentration in a concentration step as described later. Furthermore, after previously preparing a high-concentration solution of the materials for forming the light-scattering substrate, the solution may be converted to a solution with a prescribed low concentration by the addition various additives.

The solvent may be used singly or in combinations of two or more kinds thereof.

<Preparation of Dope>

With respect to the preparation of the solution (dope) of the materials for forming the light-scattering substrate, such as the cellulose acylate, its dissolution method is not particularly limited as described previously. The dissolution is carried out by a room temperature dissolution method, a cooling dissolution method or a high-temperature dissolution method, and furthermore, it is also carried out through a combination thereof. With respect to these dissolution methods, a preparation method of a cellulose acylate solution is disclosed in, for example, JP-A-5-163301, JP-A-61-106628, JP-A-58-127737, JP-A-9-95544, JP-A-10-95854, JP-A-10-45950, JP-A-11-322947, JP-A-2-276830, JP-A-2000-273239, JP-A-11-71463, JP-A-04-259511, JP-A-2000-273184, JP-A-11-323017 and JP-A-11-302388. Technologies of these dissolution methods of the cellulose acylate in an organic solvent can be properly adopted in the invention so far as they fall within the scope of the invention. With respect to details thereof, especially those of a non-chlorine based solvent system, the method disclosed in detail in the foregoing *Journal of Technical Disclosure* No. 2001-1745, pages 22 to 25 is carried out. Furthermore, the dope solution of the cellulose acylate is usually subjected to solution concentration and filtration, details of which are similarly disclosed in the foregoing *Journal of Technical Disclosure* No. 2001-1745, page 25. In the case where the dissolution is performed at a high temperature, in almost all of the cases, the temperature is a boiling point of the used organic solvent or higher. In such case, the dope solution of the cellulose acylate is used in a pressurized state.

In the case where the light-scattering substrate of the invention is used as a protective film of a polarizing plate and adhered to a polarizing film, from the viewpoint of adhesiveness to the polarizing film, it is especially preferable that the surface of the light-scattering substrate is subjected to a hydrophilic treatment such as an acid treatment, an alkali treatment, a plasma treatment and a corona treatment.

From the viewpoint of adhesiveness or the like, surface energy on the side of the side-B of the light-scattering substrate is preferably 55 mN/m or more, and more preferably 60 mN/m or more and not more than 75 mN/m, and it can be adjusted by the foregoing surface treatment.

<Polarizing Plate>
[Configuration of Polarizing Plate]

In a polarizing plate including a polarizing film and a protective film disposed on at least side thereof, the light-scattering substrate of the invention can be used as the protective film. When a polarizing plate is prepared using the light-scattering substrate of the invention, the desired optical characteristics of the invention can be obtained by using the side-A on the side of the surface of the polarizing plate and using the side-B on the side of the polarizing film. In view of the fact that the light-scattering substrate of the invention also works the protective film, the manufacturing cost of the polarizing plate can be reduced.

Also, considering a polarizing plate used for a liquid crystal display device having a backlight, using the polarizing plate of the present invention for the superficial surface on the backlight side of liquid crystal cell of the liquid crystal display device is preferable. By using the polarizing plate for the superficial surface on the backlight side of liquid crystal cell, it is possible to make both a front contrast and a reduction of moire or brightness unevenness compatible with each other. Further, using the light-scattering substrate of the present invention as a surface protective film of a polarizing plate on the backlight side with respect to a liquid crystal cell of the liquid crystal display device is preferable.

Also, with respect to the configuration of the polarizing plate, in an embodiment in which the protective film is disposed on the both sides of the polarizing film, the light-scattering substrate of the invention is used as the protective film of one side, and a usual cellulose acetate film may be used as the protective film of the other side. A retardation film can also be used as the protective film of the other side.

Furthermore, in the polarizing plate of the invention, an optical compensatory film in which one side thereof is the light-scattering substrate of the invention, whereas the protective film of the other side includes an optically anisotropic layer made of a liquid crystalline compound is also a preferred embodiment.

[Polarizing Film]

Examples of the polarizing film include an iodine based polarizing film, a dye based polarizing film using a dichroic dye and a polyene based polarizing film. The iodine based polarizing film and the dye based polarizing film can be in general manufactured using a polyvinyl alcohol based film.

Also, as the polarizing film, a known polarizing film or a polarizing film cut out from a long polarizing film in which the absorption axis of the polarizing film is neither parallel to nor vertical against the longitudinal direction may be used. The long polarizing film in which the absorption axis of the polarizing film is neither parallel to nor vertical against the longitudinal direction is prepared in the following method.

That is, the long polarizing film can be manufactured by a stretching method in which a continuously fed polymer film such as a polyvinyl alcohol based film is stretched upon being imparted with a tension while holding the both ends thereof by a holding unit and stretched, thereby stretching the film in at least a film width direction by a factor of from 1.1 to 20.0; and the direction of movement of the film is bent in a state of holding the both ends of the film such that an angle formed between the direction of movement of the film in an outlet of the step of holding the both ends of the film and the substantial stretching direction of the film is inclined by from 20° to 70° at a difference in a movement speed in the longitudinal direction of the holding unit of the both ends of the film falling within 3%. In particular, a long polarizing film inclined by 45° is preferably used from the viewpoint of productivity,

[Optical Compensatory Film]

An optical compensatory film in which of the two protective films of the polarizing film, the film other than the light-scattering substrate of the invention includes an optical compensatory layer containing an optically anisotropic layer is also a preferred embodiment. The optical compensatory film (retardation film) is able to improve a viewing angle characteristic of the liquid crystal display screen.

Though a known optical compensatory film can be used, the optical compensatory film disclosed in JP-A-2001-100042 is preferable from the standpoint of widening the viewing angle.

<Use Embodiments of the Invention>
[Image Display Device]

The light-scattering substrate of the invention is suitably used for image display devices such as a liquid crystal display device (LCD), a plasma display panel (PDP), an electroluminescence display (ELD) and a cathode ray tube display device (CRT).

[Liquid Crystal Display Device]

The light-scattering substrate and the polarizing plate of the invention can be advantageously used for image display devices such as a liquid crystal display device. It is preferable to use the polarising plate of the present invention for a superficial layer on the side of a backlight of a liquid crystal cell in a transmission or semi-transmission liquid crystal display device having a backlight. It is especially preferable to use the light-scattering substrate of the present invention for a surface protective film of the polarizing plate on the backlight side.

In general, the liquid crystal display device includes a liquid crystal cell and two polarizing plates disposed on the both sides thereof; and the liquid crystal cell carries a liquid crystal between two sheets of electrode substrates. Furthermore, one sheet of an optically anisotropic layer is disposed between the liquid crystal cell and the polarizing plate of one side, or two sheets of optically anisotropic layers may be disposed between the liquid crystal cell and each of the both polarizing plates.

The liquid crystal cell is preferably of a TN mode, a VA mode, an OCB mode, an IPS mode or an ECB mode.

EXAMPLES

Example 1

Preparation of Light-Scattering Substrate

Each of dopes was prepared in a solid composition for dope shown in the following Table 1; a base layer dope and a surface layer dope were simultaneously cast so as to have a constitution regarding a film thickness after drying as shown in the following Table 2, thereby preparing light-scattering substrates 1 to 23. With respect to the light-scattering substrates 1 to 21, the dope for the surface layer 1 was cast using a casting apparatus shown in FIG. 3 such that it was located on the side of a mirror-finished drum cooled at −10° C. and cooled for gelation while evaporating the solvent; and a web was then stripped off. The web was dried by hot air at 100° C. until the residual solvent amount reached 10% by mass and then dried by hot air at 140° C. for 10 minutes. With respect to the light-scattering substrates 22 and 23, the dope for the surface layer 1 was cast on a mirror-finished band at 18° C. using a casting apparatus shown in FIG. 4 and then dried in the same manner. All of the light-scattering substrates had a refractive index of 1.48. The film thickness shown in Table 2 expresses a designed thickness after drying.

TABLE 1

| Composition | | | Solid composition for dope | | | | | | | | | | | | | | |
|---|---|---|---|---|---|---|---|---|---|---|---|---|---|---|---|---|---|
| (solid ratio: parts by mass) | | | A | B | C | D | E | F | G | H | I | J | K | L | M | N | O |
| Cellulose triacetate | | | 100 | 100 | 100 | 100 | 100 | 100 | 100 | 100 | 100 | 100 | 100 | 100 | 100 | 100 | 100 |
| Triphenyl phosphate | | | 8 | 8 | 8 | 8 | 8 | 8 | 8 | 8 | 8 | 8 | 8 | 8 | 8 | 8 | 8 |
| Biphenyl diphenyl phosphate | | | 4 | 4 | 4 | 4 | 4 | 4 | 4 | 4 | 4 | 4 | 4 | 4 | 4 | 4 | 4 |
| Ultraviolet ray absorber | | | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Fine particle | R972 | Refractive index: 1.47 | 0.1 | — | 10.0 | — | — | — | — | — | — | — | — | — | — | — | — |
| Transparent particle | S431 | 1.47 | — | — | — | 10.0 | — | — | — | — | — | — | — | — | — | — | — |
| | KEP150 | 1.47 | — | — | — | — | 15.0 | — | — | — | — | — | — | — | — | — | — |
| | MX-350 | 1.50 | — | — | — | — | — | 15.0 | — | — | — | — | — | — | 5.0 | — | — |
| | MX-675 | 1.50 | — | — | — | — | — | — | 15.0 | — | — | — | — | — | — | — | — |
| | SKK-60MS | 1.55 | — | — | — | — | — | — | — | 15.0 | — | — | — | — | — | — | — |
| | SKK-80M | 1.50 | — | — | — | — | — | — | — | — | 6.0 | 15.0 | — | — | — | — | — |
| | SKK-80MS | 1.52 | — | — | — | — | — | — | — | — | — | — | 6.0 | 15.0 | 10.0 | — | — |
| | SKK-100M | 1.50 | — | — | — | — | — | — | — | — | — | — | — | — | — | 15.0 | — |
| | MX-1500 | 1.50 | — | — | — | — | — | — | — | — | — | — | — | — | — | — | 15.0 |

TABLE 2

| No. | Solid composition for dope | | | | Film thickness (μm) | | | | Casting apparatus | Difference in refractive index between substrate and transparent particle |
|---|---|---|---|---|---|---|---|---|---|---|
| | Surface layer 1 | Base layer | Surface layer 2 | Surface layer 3 | Surface layer 1 | Base layer | Surface layer 2 | Surface layer 3 | | |
| Light-scattering substrate 1 | A | B | C | B | 3 | 35 | 5 | 3 | FIG. 3 | — |
| Light-scattering substrate 2 | A | B | D | B | 3 | 35 | 5 | 5 | FIG. 3 | 0.01 |
| Light-scattering substrate 3 | A | B | E | B | 3 | 35 | 5 | 7 | FIG. 3 | 0.01 |
| Light-scattering substrate 4 | A | B | F | B | 3 | 35 | 5 | 4 | FIG. 3 | 0.02 |
| Light-scattering substrate 5 | A | B | G | B | 3 | 52 | 5 | 7 | FIG. 3 | 0.02 |
| Light-scattering substrate 6 | A | B | H | B | 3 | 52 | 5 | 7 | FIG. 3 | 0.07 |
| Light-scattering substrate 7 | A | I | B | — | 16 | 40 | 10 | — | FIG. 3 | 0.02 |
| Light-scattering substrate 8 | A | I | B | — | 3 | 40 | 10 | — | FIG. 3 | 0.02 |
| Light-scattering substrate 9 | A | B | I | B | 3 | 35 | 12 | 7.5 | FIG. 3 | 0.02 |
| Light-scattering substrate 10 | A | B | J | — | 3 | 35 | 7.5 | — | FIG. 3 | 0.02 |
| Light-scattering substrate 11 | A | B | J | B | 3 | 35 | 7.5 | 6 | FIG. 3 | 0.02 |
| Light-scattering substrate 12 | A | K | B | — | 16 | 40 | 10 | — | FIG. 3 | 0.04 |
| Light-scattering substrate 13 | A | B | L | — | 3 | 35 | 5 | — | FIG. 3 | 0.04 |
| Light-scattering substrate 14 | A | B | L | B | 3 | 35 | 5 | 3 | FIG. 3 | 0.04 |
| Light-scattering substrate 15 | A | B | L | B | 3 | 35 | 5 | 6 | FIG. 3 | 0.04 |
| Light-scattering substrate 16 | A | B | L | B | 3 | 35 | 5 | 10 | FIG. 3 | 0.04 |
| Light-scattering substrate 17 | A | B | L | B | 3 | 35 | 7.5 | 13 | FIG. 3 | 0.04 |
| Light-scattering substrate 18 | A | B | L | B | 3 | 35 | 5 | 35 | FIG. 3 | 0.04 |
| Light-scattering substrate 19 | A | B | M | B | 3 | 35 | 5 | 10 | FIG. 3 | 0.02 to 0.04 |
| Light-scattering substrate 20 | A | B | N | B | 3 | 35 | 5 | 10 | FIG. 3 | 0.02 |
| Light-scattering substrate 21 | A | B | O | B | 3 | 35 | 5 | 10 | FIG. 3 | 0.02 |
| Light-scattering substrate 22 | A | K | B | — | 16 | 40 | 10 | — | FIG. 4 | 0.04 |
| Light-scattering substrate 23 | A | B | K | B | 3 | 35 | 12 | 7.5 | FIG. 4 | 0.04 |

The used materials are shown below.

Cellulose triacetate: Degree of acetyl substitution: 2.86, viscosity average degree of polymerization: 310

Ultraviolet ray absorber: Benzotriazole based ultraviolet ray absorber (a mixture of TINUVIN 326 and TINUVIN 328 (20/80% by mass), each of which is manufactured by Ciba Japan K.K.)

R972: Primary particle size: about 16 nm, AEROSIL R972, manufactured by Nippon Aerosil Co., Ltd.)

S431: Mean particle size (this means a mean primary particle size; hereinafter the same): about 2.5 μm, SILYSIA 431, manufactured by Fuji Silysia Chemical Ltd.

KEP-150: Silica spherical particle, mean particle size: 2.5 μm, SEAHOSTAR KEP-150, manufactured by Nippon Shokubai Co., Ltd.

MX-350, Crosslinked polymethyl methacrylate spherical particle, mean particle size: 3.5 μm, manufactured by Soken Chemical & Engineering Co., Ltd.

MX-675: Crosslinked polymethyl methacrylate spherical particle, mean particle size: 6.0 μm, manufactured by Soken Chemical & Engineering Co., Ltd.

MX-1500: Crosslinked polymethyl methacrylate spherical particle, mean particle size: 20 μm, manufactured by Soken Chemical & Engineering Co., Ltd.

SKK-80M: Crosslinked polymethyl methacrylate spherical particle, mean particle size: 8 μm, manufactured by Sekisui Plastics Co., Ltd.

SKK-60MS: Crosslinked polymethyl methacrylate-styrene copolymer spherical particle, mean particle size: 6 μm, manufactured by Sekisui Plastics Co., Ltd.

SKK-100M: Crosslinked polymethyl methacrylate spherical particle, mean particle size: 10 μm, manufactured by Sekisui Plastics Co., Ltd.

SKK-80MS: Crosslinked polymethyl methacrylate-styrene copolymer spherical particle, mean particle size: 8 μm, manufactured by Sekisui Plastics Co., Ltd.

By using a mixed solvent of methylene chloride and methanol in a mass ratio of 90/10, the solids concentration of the dope used for base layer was adjusted at 23% by mass, the solids concentration of the dope used for transparent particle-free or fine particle-free surface layer was adjusted at 18% by mass, and the solids concentration of the dope used for transparent particle-containing or fine particle-containing surface layer was adjusted so that the solids concentration without particles became 18.5% by mass. Each of the dopes containing transparent particle or fine particle was prepared by adding the particle in the amount shown in table 1 separately to each dope having the above mentioned solids concentration. Viscosities of the surface layer dopes disposed on the side of the superficial surface (side-A) on the air side of the light-scattering substrate at room temperature (25° C.) were 36 Pa·s (dope B), 39 Pa·s (dope J) and 41 Pa·s (dope L) respectively. Here, in the composition shown in Table 1, the concentration of the thermoplastic resin is also in proportion to the foregoing solids concentration, namely the higher the solids concentration of the dope, the higher the concentration of the thermoplastic resin.

Also, the refractive index of the particle was measured by dispersing an equal amount of the particle in a solvent whose refractive index was changed by changing a mixing ratio of two kinds of solvents having a different refractive index from each other, measuring a turbidity and measuring a refractive index of the solvent when the turbidity became minimum by using an Abbe's refractometer.

[Preparation of Polarizing Plate]

Each of the prepared light-scattering substrates 1 to 23 was dipped in a 1.5 N NaOH aqueous solution at 55° C. for 2 minutes, subjected to a saponification treatment and then dried at 100° C. for 3 minutes. The side-B of the light-scattering substrate after the saponification, a stretched iodine based PVA polarizer and triacetyl cellulose (TD80UL, manufactured by Fujifilm Corporation) were stuck in this order with a PVA based adhesive and then heat dried, thereby obtaining polarizing plates 1 to 23. The polarizing plate 8 using the light-scattering substrate 8 deserved evaluation because of the generation of an air bubble within the sticking plane.

[Preparation of Image Display Device]

A laptop PC, manufactured by LG Display (R700-XP50K) was disassembled; an upper diffusion sheet located between a backlight and a liquid crystal panel was taken out; a polarizing plate on the backlight side stuck to a liquid crystal cell was further stripped off; and instead thereof, each of the polarizing plates 1 to 23 was stuck via an adhesive.

[Evaluation of Light-Scattering Substrate and Image Display Device Using the Same]

Each of the prepared light-scattering substrates 1 to 23 was evaluated in the following manners.

(1) Measurement of Surface Shape:

An arithmetic mean roughness Ra, a mean crest/root spacing Sm and a mean tilt angle θa of the side-A were measured using SURFCORDER MODEL SE-3500, manufactured by Kosaka Laboratory Ltd. in conformity with JIS B0601 (1994, 2001).

(2) Measurement of Tilt Angle Distribution Profile:

The curing compound on the surface of the side-A of the obtained light-scattering substrate was measured using Model SXM520-AS150, manufactured by Micromap Corporation (U.S.A.). A halogen lamp in which an interference filter having a central wavelength of 560 nm was incorporated was used as a light source. A power of an objective lens was 10 times, and data were captured with a ⅔-inch CCD having pixels of 640×480. According to this, a measurement pitch in the longitudinal and lateral directions was 1.3 µm; a measurement unit for the tilt angle was 0.8 µm$^2$; and a measurement area was 500,000 µm$^2$ (0.5 mm$^2$).

The tile angle was calculated from height data of three points as a measurement unit, and integrated values of the frequency of the tilt angle component having a tilt angle of 0° or more and less than 0.5°, 0.5° or more and less than 10.0° and 10° or more, respectively were determined.

Figure 7:
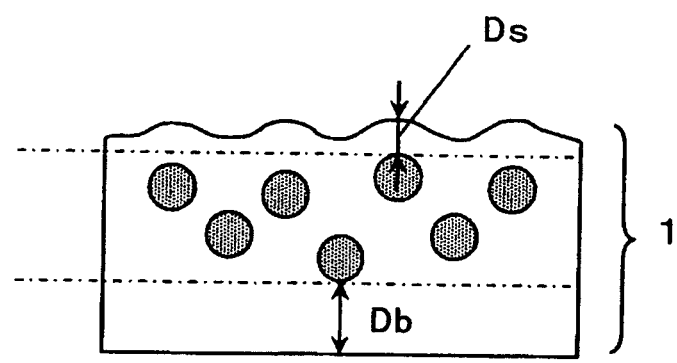
FIG. 7 is a schematic view showing a section of a light-scattering substrate.

(3) Observation of Sectional Shape of Light-Scattering Substrate and Observation of Thickness Direction Position of Particle:

A section of the light-scattering substrate was cut by a microtome so as to pass through the center of the particle; the section of the substrate was observed by a scanning electron microscope; and a distance (thickness) of the particle interface to each of the surface of the side-A and the surface of the side-B was measured. A schematic view of the section of the substrate is shown in FIG. 7. Twenty points were measured; and a minimum value to the surface of the side-A was defined as $D_s$, and a minimum value to the surface of the side-B was defined as $D_b$ (see FIG. 7).

In Table 3, the region where no particle is present is represented as "Ds/(Mean particle size)" and "Db/(Mean particle size)". Here, the mean particle size represents a mean particle size of fine particles or transparent fine particles used for preparatiing each light-scattering substrate. In a case where plural kinds of particles are used, the mean particle size represents a mean particle size of one kind of particles having the largest mean particle size.

(4) Transmitted Image Clarity:

An image clarity (%) of the light-scattering substrate was measured using ICM-1T, manufactured by Suga Test Instruments Co., Ltd. in conformity with JIS K7105 (1999). A value measured by an optical comb having a width of 2.0 mm is defined as the image clarity in the invention.

Figure 5:
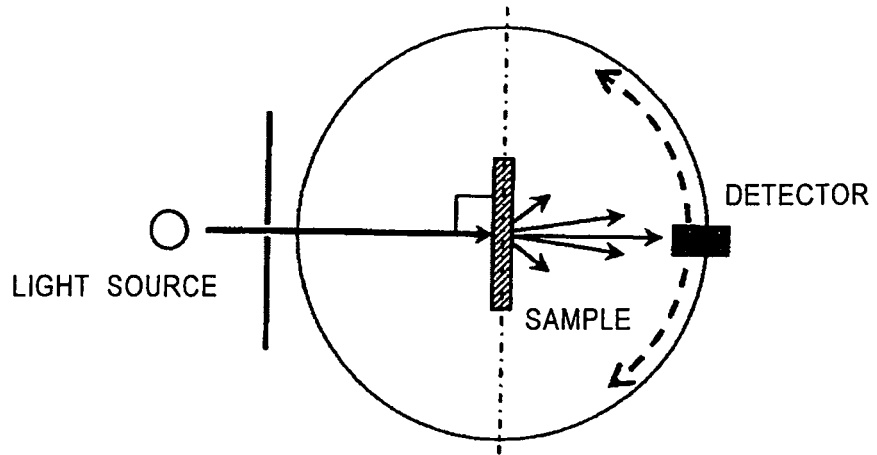
FIG. 5 is a schematic view of a light scattering measuring apparatus.

(5) Measurement of Light Scattering Profile:

The light scattering profile was measured using a goniophotometer (GP-5, manufactured by Murakami Color Research Laboratory. As shown in FIG. 5, the measurement was carried out under a condition of convergent light with an angle of 1.5° as a light source and a detector with an acceptance angle of 2°. The light was made incident from the normal line direction of the obtained light-scattering substrate, and the quantity of transmitted scattered light was measured while continuously changing the angle within a plane including the film normal line, thereby obtaining a light scattering profile. The quantity of transmitted scattered light was calculated while defining the quantity of light of the light source in a film-free state as 1.

(6) Measurement of Haze:

[1] A total haze value (H) of the obtained light-scattering substrate was measured using a haze meter NDH2000, manufactured by Nippon Denshoku Industries Co., Ltd. in conformity with JIS K7136.

[2] A few drops of an immersion oil for microscope (IMMERSION OIL TYPE A, manufactured by Nikon Corporation, refractive index n: 1.515) were added on each of the front surface and the back surface of the light-scattering substrate; the optical film was interposed between two glass sheets having a thickness of 1 mm (MICRO SLIDE GLASS Product No. 59111, manufactured by Matsunami Glass Ind., Ltd.) from the back and front directions; the two glass sheets and the optical film were brought into completely intimate contact with each other; the haze was measured in a state from which the surface haze was eliminated; and a value obtained by subtracting a haze which was separately measured by interposing only a silicone oil between two glass sheets therefrom was calculated as an internal haze (Hin) of the film.

[3] A value obtained by subtracting the internal haze (Hin) calculated in the foregoing [2] from the total haze (H) measured in the foregoing [1] was calculated as a surface haze (Hout) of the film.

(7) Moire:

Signals were inputted in the prepared liquid crystal display device from a video signal generator (VG-848, manufactured by Astrodesign Inc.); the liquid crystal display device was subjected to gray display with a 128/256 gradation in terms of entire solid display; and the screen was visually observed from various directions in a dark room, thereby evaluating the presence or absence of the generation of moire.

A: Moire is not observed.
B: Moire is slightly observed, but it is not conscious.
C: Moire is distinctly observed.

(8) Front White Brightness:

The liquid crystal display device was subjected to white display with a 256/256 gradation in terms of entire solid display in the same manner as in the evaluation of moire; and a brightness was measured from the normal line (front) direction of the plane of the liquid crystal display device in a dark room using a luminance colorimeter (BM5-A, manufactured by Topcon Corporation). Five points in total including each one point in the vertical direction and each one point in the horizontal direction at intervals of 3 cm from the central point of the screen were measured, and a mean value thereof was calculated. The evaluation was made according to the following three grades on the basis of the case of not using the light-scattering substrate on the surface of the polarizing plate on the backlight side.

A: The brightness is not substantially lowered (99% or more of the standar value).
B: The brightness is somewhat lowered (97% or more and less than 99% of the standard value).
C: The brightness is lowered (less than 97% of the standard value) and is on a level where problem occurs.

(9) Evaluation of Scar Resistance:

A prism sheet was taken out from a laptop PC, manufactured by LG Display (R700-XP50K) and installed on an indenter side of a Gakushin-type abrasion tester, and the surface of the side-A of the prepared light-scattering substrate was scarred, thereby evaluating a degree of scar on the surface of the side-A. An area of the prism sheet was set to be 1 cm$^2$, and a load of 200 g was reciprocated ten times.

A: The scar is not seen at all.
B: The scar is slightly generated but is on a level where no problem occurs in view of optical characteristics.
C: The scar is clearly generated, leading to a problem in view of optical characteristics.

The evaluation results of each of the samples and the display performance at the time of using the light-scattering substrate as a protective film of the polarizing plate on the backlight side of the liquid crystal display device are shown in the following Tables 3-1 and 3-2.

TABLE 3-1

| Film No. | Region where no particle is present Ds/(Mean particle size) | Db/(Mean particle size) | Surface roughness Ra (μm) | Sm (μm) | θa (°) | Frequency of tilt angle (%) 0° or more and less than 0.5° | 0.5° or more and less than 10° | 10° or more |
|---|---|---|---|---|---|---|---|---|
| Light-scattering substrate 1 | >4.0 | >1.5 | 0.01 | 42 | 0.0 | 99% | 1% | 0% |
| Light-scattering substrate 2 | >4.0 | >1.5 | 0.04 | 36 | 0.1 | 44% | 54% | 2% |
| Light-scattering substrate 3 | 4.51 | >1.5 | 0.02 | 65 | 0.1 | 52% | 48% | 0% |
| Light-scattering substrate 4 | 1.20 | >1.5 | 0.08 | 62 | 0.5 | 23% | 77% | 0% |
| Light-scattering substrate 5 | 1.08 | >1.5 | 0.18 | 72 | 1.3 | 24% | 70% | 6% |
| Light-scattering substrate 6 | 1.26 | >1.5 | 0.19 | 76 | 1.4 | 22% | 71% | 7% |
| Light-scattering substrate 7 | 0.85 | >1.5 | 0.28 | 77 | 1.7 | 18% | 71% | 11% |
| Light-scattering substrate 8 | 0.83 | 0.43 | — | — | — | — | — | — |
| Light-scattering substrate 9 | 0.96 | >1.5 | 0.22 | 112 | 1.4 | 18% | 72% | 10% |
| Light-scattering substrate 10 | 0.11 | >1.5 | 0.65 | 48 | 6.2 | 13% | 59% | 28% |
| Light-scattering substrate 11 | 0.78 | >1.5 | 0.29 | 120 | 1.7 | 10% | 79% | 11% |
| Light-scattering substrate 12 | 0.90 | >1.5 | 0.27 | 81 | 1.6 | 17% | 72% | 11% |
| Light-scattering substrate 13 | 0.14 | >1.5 | 0.51 | 66 | 5.2 | 46% | 41% | 13% |
| Light-scattering substrate 14 | 0.46 | >1.5 | 0.37 | 86 | 3.2 | 31% | 57% | 12% |
| Light-scattering substrate 15 | 0.74 | >1.5 | 0.23 | 106 | 1.6 | 18% | 72% | 10% |
| Light-scattering substrate 16 | 1.10 | >1.5 | 0.16 | 83 | 1.2 | 16% | 76% | 8% |
| Light-scattering substrate 17 | 1.40 | >1.5 | 0.14 | 79 | 1.3 | 15% | 77% | 8% |
| Light-scattering substrate 18 | 4.24 | >1.5 | 0.02 | 205 | 0.03 | 32% | 64% | 4% |
| Light-scattering substrate 19 | 1.08 | >1.5 | 0.17 | 62 | 1.4 | 21% | 66% | 13% |
| Light-scattering substrate 20 | 0.85 | >1.5 | 0.26 | 124 | 1.8 | 22% | 66% | 12% |
| Light-scattering substrate 21 | 0.87 | >1.5 | 0.35 | 163 | 0.5 | 28% | 50% | 22% |
| Light-scattering substrate 22 | 0.88 | >1.5 | 0.25 | 80 | 1.5 | 18% | 70% | 12% |
| Light-scattering substrate 23 | 0.90 | >1.5 | 0.20 | 124 | 1.2 | 20% | 70% | 10% |

TABLE 3-2

| Film No. | Clarity of transmitted image (Comb width: 2.0 mm) | Distribution of scattering angle 1(4°)/10 × 100 | Haze | | Display performance | | | Remark |
|---|---|---|---|---|---|---|---|---|
| | | | Surface haze (%) | Internal haze (%) | Moire | Front brightness | Scar of prism sheet | |
| Light-scattering substrate 1 | 98.1 | 0.1 | 0.4 | 0.2 | C | A | A | Comparison |
| Light-scattering substrate 2 | 88.7 | 1.1 | 1.2 | 0.2 | C | A | A | Comparison |
| Light-scattering substrate 3 | 85.4 | 0.9 | 5.4 | 0.2 | C | A | A | Comparison |
| Light-scattering substrate 4 | 61.5 | 2.8 | 10.5 | 0.3 | B | A | A | Invention |
| Light-scattering substrate 5 | 49.7 | 4.8 | 15.1 | 0.3 | A | A | A | Invention |
| Light-scattering substrate 6 | 58.1 | 3.7 | 13.8 | 10.2 | A | A | A | Invention |
| Light-scattering substrate 7 | 56.2 | 5.4 | 11.3 | 0.4 | A | A | B | Invention |
| Light-scattering substrate 8 | — | — | — | — | — | — | — | Comparison |
| Light-scattering substrate 9 | 46.5 | 5.8 | 17.6 | 0.8 | A | A | B | Invention |
| Light-scattering substrate 10 | 65.0 | 2.6 | 42.1 | 0.6 | C | C | C | Comparison |
| Light-scattering substrate 11 | 45.6 | 4.4 | 21.8 | 0.4 | A | A | B | Invention |
| Light-scattering substrate 12 | 43.2 | 6.5 | 10.5 | 24.6 | A | B | B | Invention |
| Light-scattering substrate 13 | 80.3 | 1.8 | 27.5 | 7.8 | C | B | C | Comparison |
| Light-scattering substrate 14 | 62.3 | 2.2 | 25.2 | 7.6 | C | B | B | Comparison |
| Light-scattering substrate 15 | 43.3 | 6.2 | 21.0 | 7.8 | B | A | B | Invention |
| Light-scattering substrate 16 | 28.5 | 6.5 | 16.2 | 7.7 | A | A | A | Invention |
| Light-scattering substrate 17 | 23.9 | 6.6 | 13.6 | 10.2 | A | A | A | Invention |
| Light-scattering substrate 18 | 89.6 | 0.9 | 1.2 | 7.9 | C | A | A | Comparison |
| Light-scattering substrate 19 | 53.1 | 5.2 | 12.5 | 5.2 | A | A | A | Invention |
| Light-scattering substrate 20 | 36.4 | 6.8 | 18.6 | 0.4 | A | A | B | Invention |
| Light-scattering substrate 21 | 40.6 | 7.3 | 22.7 | 0.3 | A | C | C | Comparison |
| Light-scattering substrate 22 | 45.8 | 6.2 | 9.6 | 23.8 | A | A | B | Invention |
| Light-scattering substrate 23 | 42.1 | 5.4 | 15.3 | 6.1 | A | A | A | Invention |

Example 2

A dope having a composition shown in the following Table 4 was prepared; and a light-scattering substrate 24 was prepared in the same manner as in the light-scattering substrate 23, except for using a dope P-1 in place of the dope A (surface layer 1), a dope P-2 in place of the dope B (base layer), a dope P-3 in place of the dope K (surface layer 2) and a dope P-1 in place of the dope B (surface layer 3), respectively in the light-scattering substrate 23. The light-scattering substrate 24 had a refractive index of 1.48. A viscosity of the surface layer dope P-1 disposed on the side of the superficial surface (side-A) on the air side of the light-scattering substrate at room temperature (25° C.) was 26 Pa·s.

Example 3

A dope having a composition shown in the following Table 4 was prepared; and a light-scattering substrate 25 was prepared in the same manner as in the light-scattering substrate 23, except for using a dope Q-3 in place of the dope A (surface layer 1), a dope Q-1 in place of the dope B (base layer), a dope Q-2 in place of the dope K (surface layer 2) and a dope Q-3 in place of the dope B (surface layer 3), respectively in the light-scattering substrate 23. The used materials are shown below. The light-scattering substrate 25 had a refractive index of 1.58. In Table 4, the polycarbonate is a polycarbonate resin having a mass average molecular weight of 45,000. A viscosity of the surface layer dope Q-3 disposed on the side of the superficial surface (side-A) on the air side of the light-scattering substrate at room temperature (25° C.) was 22 Pa·s.

Also, the following material was used.

SBX-8: Crosslinked polystyrene spherical particle, mean particle size: 8 μm, manufactured by Sekisui Plastics Co., Ltd.

TABLE 4

| Composition (parts by mass) | | | Type of dope | | | | | |
|---|---|---|---|---|---|---|---|---|
| | | | P-1 | P-2 | P-3 | Q-1 | Q-2 | Q-3 |
| Cellulose acetate butyrate | | | 100 | 100 | 100 | — | — | — |
| Polycarbonate | | | — | — | — | 100 | 100 | 100 |
| Triphenyl phosphate | | | 8 | 8 | 8 | — | — | — |
| Biphenyl diphenyl phosphate | | | 4 | 4 | 4 | — | — | — |
| Ultraviolet ray absorber | | | 2.0 | 2.0 | 2.0 | 2.0 | 2.0 | 2.0 |
| Fine particle | R972 | Refractive index: 1.47 | 0.1 | — | — | — | — | — |
| Transparent fine particle | SKK-80M | 1.50 | — | — | 15.0 | — | — | — |
| | SBX-8 | 1.59 | — | — | — | — | 15.0 | — |
| Solvent | Methylene chloride | | 441 | 324 | 500 | 290 | 453 | 453 |
| | Methanol | | 78 | 57 | 88 | 51 | 80 | 80 |

The same evaluations were carried out. As a result, it was confirmed that both the light-scattering substrates 24 and 25 displayed substantially the same performance as in the light-scattering substrate 23 inclusive of the values of Ds and Db.

From Table 4, by using the light-scattering substrate of the invention as the protective film of the polarizing plate on the backlight side of the liquid crystal display device, an image display device which does not cause a lowering of the front white brightness and moire and which is excellent in the scar resistance against the adjacent member.

The invention is applicable especially as a protective film of a polarizing plate on the side of a backlight of a liquid crystal display device, is high in a front white brightness and uniform and capable of suppressing interference-induced stripes such as moire within a screen.

In the case where the light-scattering substrate obtained by the invention is used especially as a protective film of a polarizing plate on the side of a backlight of a liquid crystal display device, an image display with high uniformity of brightness without causing a lowering of the front white brightness and moire.

The entire disclosure of each and every foreign patent application from which the benefit of foreign priority has been claimed in the present application is incorporated herein by reference, as if fully set forth.

What is claimed is:

1. A light-scattering substrate having an irregular shape on one surface thereof, the light-scattering substrate comprising:
a thermoplastic resin; and
at least one kind of transparent particles having a mean primary particle size of 3 μm or more and not more than 12 μm,
wherein the light-scattering substrate contains a first region having a thickness of ½ or more times and not more than 4 times the mean primary particle size of the transparent particles from the surface having an irregular shape; and a second region having a thickness of 3/2 or more times the mean primary particle size of the transparent particles from a surface on back side of the surface having an irregular shape,
wherein the first region and the second region have a region not substantially containing the transparent particles, and
wherein a tilt angle of irregularities of the surface of the light-scattering substrate having an irregular shape has the following distribution:
(a) an integrated value of the frequency of 0° or more and less than 0.5° is less than 25%;
(b) an integrated value of the frequency of 0.5° or more and less than 10° is 65% or more and less than 100%; and
(c) an integrated value of the frequency of 10° or more is 0% or more and less than 20%.

2. The light-scattering substrate according to claim 1, wherein the surface of the light-scattering substrate having an irregular shape has an arithmetic mean roughness Ra, a mean spacing of irregularities Sm and a mean tilt angle of irregularities θa in conformity with JIS B0601, which are satisfied with following expressions (1) to (3):

$$0.03 \text{ μm} \leq Ra \leq 0.3 \text{ μm} \tag{1}$$

$$10 \text{ μm} \leq Sm \leq 300 \text{ μm} \tag{2}$$

$$0.2° \leq \theta a \leq 2.5° \tag{3}$$

3. The light-scattering substrate according to claim 1, wherein the transparent particles are substantially spherical resin particles.

4. The light-scattering substrate according to claim 1, wherein an absolute value of a difference between a refractive index of the transparent particles and a refractive index of the light-scattering substrate in the case of excluding the transparent particles from the light-scattering substrate is less than 0.09.

5. The light-scattering substrate according to claim 1, which has light scattering properties such that a value of an image clarity measured through an optical comb having a width of 2 mm by using an image clarity measuring apparatus in conformity with JIS K7105 is from 5% to 60%.

6. The light-scattering substrate according to claim 1, wherein a transmitted scattered-light profile measured by a goniophotometer with an acceptance angle of 2° is satisfied with following expression (d):

$$0.03 \leq I(4°)/I0 \leq 0.07 \tag{d}$$

wherein I(4°) represents an transmitted light intensity at a position tilted by 4° from a normal line of the light-scattering substrate; and I0 represents a light intensity when a light source is measured from the front.

7. The light-scattering substrate according to claim 1, wherein a haze value caused by inside is 0.1% or more and less than 30%; and a haze value caused by surface is 3% or more and less than 30%.

8. The light-scattering substrate according to claim 1, wherein a main component of the light-scattering substrate is the thermoplastic resin selected from the group consisting of triacetyl cellulose, diacetyl cellulose, acetyl butyryl cellulose, propionyl cellulose, polycarbonate, and modified polymethyl methacrylate.

9. A polarizing plate, comprising:
a polarizing film; and
a protective film on or above at least one side of the polarizing film,
wherein the protective film is the light-scattering substrate according to claim 1.

10. An image display device, comprising:
the light-scattering substrate according to claim 1.

11. An image display device, comprising:
a light source;
a lower polarizing plate;
a liquid crystal cell; and
an upper polarizing plate in this order,
wherein the lower polarizing plate is the polarizing plate according to claim 9.

12. A light-scattering substrate having an irregular shape on one surface thereof, the light-scattering substrate comprising:
a thermoplastic resin; and
at least one kind of transparent particles having a mean primary particle size of 3 μm or more and not more than 12 μm,
wherein the light-scattering substrate contains a first region having a thickness of ½ or more times and not more than 4 times the mean primary particle size of the transparent particles from the surface having an irregular shape; and a second region having a thickness of 3/2 or more times the mean primary particle size of the transparent particles from a surface on back side of the surface having an irregular shape,
wherein the first region and the second region have a region not substantially containing the transparent particles, and
which has light scattering properties such that a value of an image clarity measured through an optical comb having a width of 2 mm by using an image clarity measuring apparatus in conformity with JIS K7105 is from 5% to 60%.

13. A polarizing plate, comprising:
a polarizing film; and
a protective film on or above at least one side of the polarizing film,
wherein the protective film is the light-scattering substrate according to claim 12.

14. An image display device, comprising:
the light-scattering substrate according to claim 12.

15. An image display device, comprising:
a light source;
a lower polarizing plate;
a liquid crystal cell; and
an upper polarizing plate in this order,
wherein the lower polarizing plate is the polarizing plate according to claim 13.

16. A light-scattering substrate having an irregular shape on one surface thereof, the light-scattering substrate comprising:
a thermoplastic resin; and
at least one kind of transparent particles having a mean primary particle size of 3 μm or more and not more than 12 μm,
wherein the light-scattering substrate contains a first region having a thickness of ½ or more times and not more than 4 times the mean primary particle size of the transparent particles from the surface having an irregular shape; and a second region having a thickness of 3/2 or more times the mean primary particle size of the transparent particles from a surface on back side of the surface having an irregular shape,
wherein the first region and the second region have a region not substantially containing the transparent particles,
wherein a transmitted scattered-light profile measured by a goniophotometer with an acceptance angle of 2° is satisfied with following expression (d):

$$0.03 \leq I(4°)/I0 \leq 0.07 \qquad \text{(d), and}$$

wherein I(4°) represents an transmitted light intensity at a position tilted by 4° from a normal line of the light-scattering substrate; and I0 represents a light intensity when a light source is measured from the front.

17. A polarizing plate, comprising:
a polarizing film; and
a protective film on or above at least one side of the polarizing film,
wherein the protective film is the light-scattering substrate according to claim 16.

18. An image display device, comprising:
the light-scattering substrate according to claim 16.

19. An image display device, comprising:
a light source;
a lower polarizing plate;
a liquid crystal cell; and
an upper polarizing plate in this order,
wherein the lower polarizing plate is the polarizing plate according to claim 17.

* * * * *